US012315440B2

(12) United States Patent
Kazemi et al.

(10) Patent No.: US 12,315,440 B2
(45) Date of Patent: May 27, 2025

(54) DISPLAY DEVICE

(71) Applicant: SHARP KABUSHIKI KAISHA, Sakai (JP)

(72) Inventors: Mohammad Reza Kazemi, Sakai (JP); Masafumi Ueno, Sakai (JP); Masaaki Moriya, Sakai (JP); Naoki Shiobara, Sakai (JP); Masafumi Kawai, Sakai (JP); Hiroyuki Furukawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/288,945

(22) PCT Filed: Jun. 14, 2021

(86) PCT No.: PCT/JP2021/022482
§ 371 (c)(1),
(2) Date: Oct. 30, 2023

(87) PCT Pub. No.: WO2022/264200
PCT Pub. Date: Dec. 22, 2022

(65) Prior Publication Data

US 2024/0203341 A1 Jun. 20, 2024

(51) Int. Cl.
*G09G 3/00* (2006.01)
*G09G 3/3208* (2016.01)
(Continued)

(52) U.S. Cl.
CPC ........... *G09G 3/3225* (2013.01); *G09G 3/006* (2013.01); *G09G 3/3208* (2013.01);
(Continued)

(58) Field of Classification Search
CPC ........... G09G 2320/043; G09G 3/3233; G09G 2320/045; G09G 2320/0233; G09G 2320/029; G09G 2320/0295; G09G 3/006; G09G 2320/0285; G09G 3/3283; G09G 3/3208; G09G 2300/0819;
(Continued)

(56) References Cited

U.S. PATENT DOCUMENTS 10,209,551 B2 * 2/2019 Lin ...................... G09G 3/3633
10,930,206 B2 * 2/2021 Zhao ...................... G09G 3/006
(Continued)

FOREIGN PATENT DOCUMENTS

JP 2016-090940 A 5/2016
WO 2017/104631 A1 6/2017

*Primary Examiner* — Dismery Mercedes
(74) *Attorney, Agent, or Firm* — ScienBiziP, P.C.

(57) ABSTRACT

A display device includes a display panel including a group of pixels; a control unit configured to execute deterioration monitoring for detecting a decrease in luminous efficiency of the group of pixels and first high-speed monitoring for determining whether to execute the deterioration monitoring, the first high-speed monitoring being executed at a faster speed than the deterioration monitoring; and a storage unit configured to store reference data specifying an acceptable range for executing the deterioration monitoring. The control unit executes the deterioration monitoring in a case where a first high-speed monitoring measurement value obtained by the first high-speed monitoring is within the acceptable range.

9 Claims, 17 Drawing Sheets

(51) Int. Cl.
*G09G 3/3225* (2016.01)
*G09G 3/3233* (2016.01)
*G09G 3/3258* (2016.01)

(52) U.S. Cl.
CPC ......... *G09G 3/3233* (2013.01); *G09G 3/3258* (2013.01); *G09G 2300/0413* (2013.01); *G09G 2300/0819* (2013.01); *G09G 2300/0861* (2013.01); *G09G 2320/0233* (2013.01); *G09G 2320/0242* (2013.01); *G09G 2320/029* (2013.01); *G09G 2320/0295* (2013.01); *G09G 2320/041* (2013.01); *G09G 2320/043* (2013.01); *G09G 2320/045* (2013.01); *G09G 2360/16* (2013.01)

(58) Field of Classification Search
CPC ..... G09G 2320/0242; G09G 2320/041; G09G 2360/16; G09G 3/3406; G09G 2320/0626; G09G 3/20; G09G 2320/0247
See application file for complete search history.

(56) References Cited

U.S. PATENT DOCUMENTS

| | | | | |
|---|---|---|---|---|
| 11,315,524 | B2 * | 4/2022 | An | G09G 5/10 |
| 2014/0191989 | A1 * | 7/2014 | Saitoh | G06F 3/04166 345/173 |
| 2015/0154908 | A1 * | 6/2015 | Nam | G09G 3/3233 345/76 |
| 2016/0062548 | A1 * | 3/2016 | Kwon | G06T 1/20 345/82 |
| 2016/0293102 | A1 * | 10/2016 | Chaji | G09G 3/20 |
| 2017/0004765 | A1 * | 1/2017 | Tani | G09G 3/3275 |
| 2017/0025061 | A1 * | 1/2017 | Takizawa | G09G 3/3291 |
| 2017/0032723 | A1 * | 2/2017 | Kim | G09G 3/3266 |
| 2017/0067957 | A1 * | 3/2017 | Lee | H05B 45/60 |
| 2017/0069238 | A1 * | 3/2017 | Moon | G09G 3/006 |
| 2018/0366061 | A1 * | 12/2018 | Furukawa | G09G 3/20 |
| 2020/0020278 | A1 * | 1/2020 | Lee | G09G 3/3275 |
| 2020/0184887 | A1 * | 6/2020 | Nien | G09G 3/3225 |
| 2020/0372861 | A1 * | 11/2020 | Ok | G09G 3/3233 |

* cited by examiner

DISPLAY DEVICE

TECHNICAL FIELD

The disclosure relates to a display device.

BACKGROUND ART

In PTL1, a display device is described that includes a circuit element including a drive transistor. In the display device, the current-voltage characteristics of the circuit element including the drive transistor are measured, and an input image signal is corrected on the basis of the characteristics data obtained as a result of the measurement.

CITATION LIST

Patent Literature

PTL1: WO 2017/104631

SUMMARY

Technical Problem

The current-voltage characteristics of a group of pixels including a drive transistor may change depending on the environment in which the group of pixels is used. Thus, when deterioration compensation is executed, an accurate measurement result may not be obtained depending on the timing of the current-voltage measurement of the group of pixels. According to the display device described in PTL1, it is not possible to determine whether the current-voltage characteristics of the circuit element including the drive transistor are in an accurately measurable state. A display device according to an aspect of the disclosure suppresses execution of deterioration monitoring for detecting a decrease in the luminous efficiency of a group of pixels when the luminous efficiency of a group of pixels is in a temporary state of change.

Solution to Problem

A display device according to an aspect of the disclosure includes a display panel including a group of pixels; a control unit configured to execute deterioration monitoring for detecting a decrease in luminous efficiency of the group of pixels and first high-speed monitoring for determining whether to execute the deterioration monitoring, the first high-speed monitoring being executed at a faster speed than the deterioration monitoring; and a storage unit configured to store reference data specifying an acceptable range for executing the deterioration monitoring, wherein the control unit executes the deterioration monitoring in a case where a first high-speed monitoring measurement value obtained by the first high-speed monitoring is within the acceptable range.

DESCRIPTION OF EMBODIMENTS

Embodiments

Figure 1:
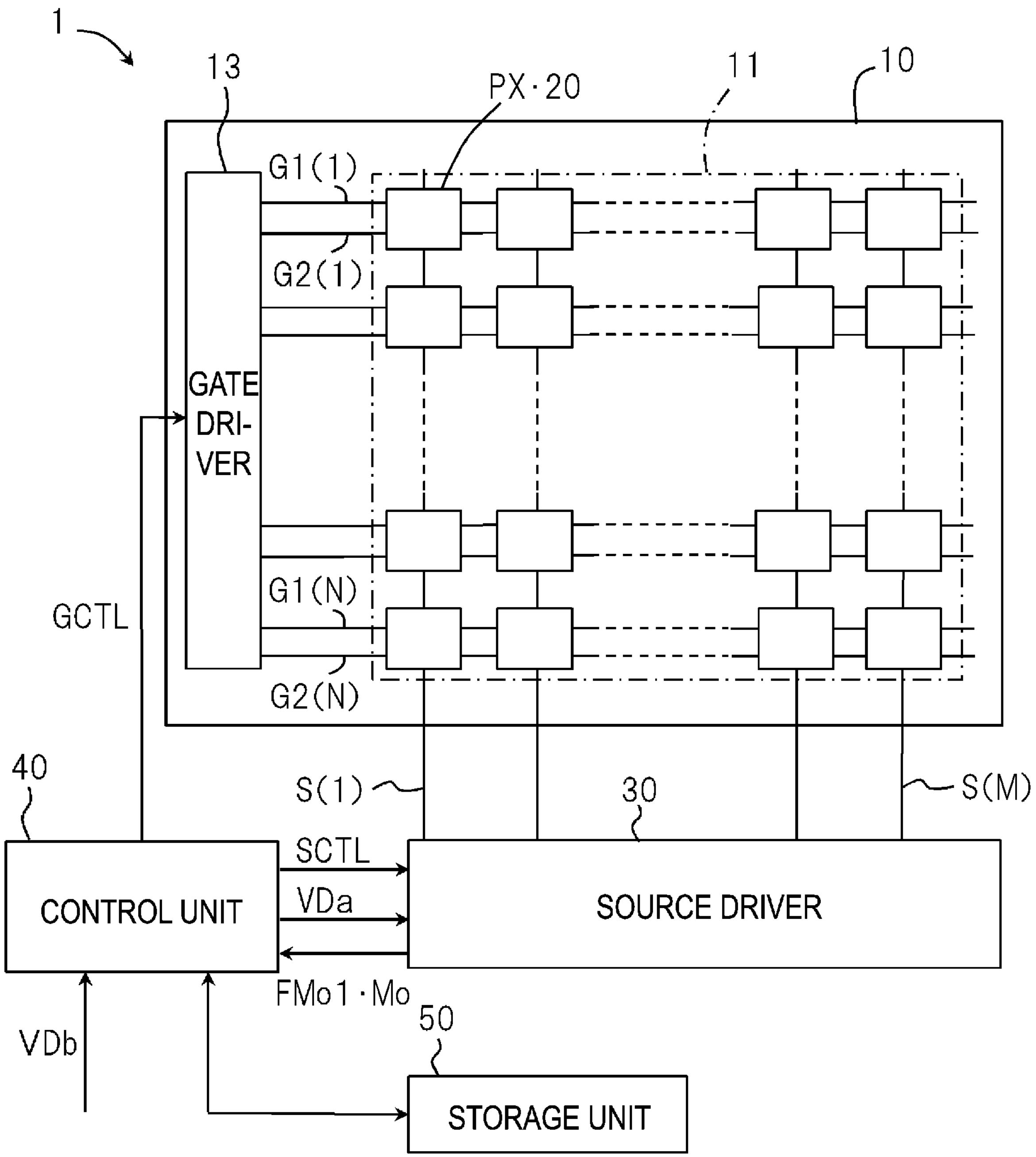
FIG. 1 is a diagram illustrating a schematic configuration of a display device according to an embodiment.

FIG. 1 is a diagram illustrating a schematic configuration of a display device 1 according to an embodiment. The display device 1 includes a display panel 10, a source driver 30, a control unit 40, and a storage unit 50. The display panel 10 includes a group of pixels PX, a gate driver 13, gate lines G1(1) to G1(N), monitor control lines G2(1) to G2(N), and data lines S(1) to S(M). The group of pixels PX are provided in a matrix shape in a display region 11 for images of the display panel 10. Each pixel in the group of pixels PX includes a pixel circuit 20 including a light-emitting element.

In the display panel 10, for example, the group of pixels PX self-emits light to display an image in the display region 11. Examples of the display panel 10 include, for example, an organic electro-luminescence (EL) display panel with an organic light-emitting diode (OLED) used as the light-emitting element and a quantum dot light-emitting diode (QLED) display panel with a QLED used as the light-emitting element. Note that it is sufficient that the display panel 10 is a display panel including a light-emitting element, and the display panel 10 is not limited to an organic EL display panel or a QLED display panel.

The gate lines G1(1) to G1(N) and the monitor control lines G2(1) to G2(N) are in one-to-one correspondence and extend substantially parallel with one another. The data lines S(1) to S(M) extend intersecting with the gate lines G1(1) to G1(N) and the monitor control lines G2(1) to G2(N). Each pixel PX is provided at a portion where the gate lines G1(1) to G1(N) and the monitor control lines G2(1) to G2(N) intersect with the data lines S(1) to S(M).

The gate lines G1(1) to G1(N) are wiring lines that output a scanning signal for selecting the group of pixels PX per row from the gate driver 13 to the group of pixels PX. The monitor control lines G2(1) to G2(N) are wiring lines that output a monitor control signal for selecting the group of pixels PX per row from the gate driver 13 to the group of pixels PX when deterioration monitoring and first high-speed monitoring are executed.

Note that the deterioration monitoring is processing including detecting a decrease in the luminous efficiency of each pixel in the group of pixels PX and obtaining a compensation voltage value (deterioration monitoring measurement value) VC (see FIG. 2) for executing deterioration compensation for the decreased luminous efficiency of each pixel of the group of pixels PX. Since the compensation voltage value VC is used when compensation data 51 (see FIG. 2) for executing deterioration compensation to obtain an image signal VDa from an input image signal VDb as described below, there is a need to detect the change in the luminous efficiency (for example, the change in the current-voltage characteristics) of each pixel of the group of pixels PX with relatively higher accuracy. Thus, the processing time of the deterioration monitoring is relatively longer than that of the first high-speed monitoring.

Also, for example, when the temperature of the use environment of the display device 1 increases, the amount of current flowing through the group of pixels PX increases, and thus the current-voltage characteristics change. As described above, if the luminous efficiency of each pixel of the group of pixels PX temporarily changes greatly (for example, the current-voltage characteristics change greatly) due to, for example, a change in temperature of the use environment of the display device 1 before or during the deterioration monitoring, the compensation voltage value VC may not be accurately obtained.

On the other hand, the first high-speed monitoring is processing executed before the deterioration monitoring in order to determine, for example, whether the luminous efficiency of each pixel of the group of pixels PX has temporarily changed greatly (for example, the current-voltage characteristics have changed greatly), that is, whether the display device 1 is in a state in which the deterioration monitoring can be executed. Thus, the first high-speed monitoring detects a change in luminous efficiency (for example, a change in current-voltage characteristics) of each pixel of the group of pixels PX in a more simplified manner than the deterioration monitoring. Thus, the speed at which the first high-speed monitoring detects a change in luminous efficiency (for example, a change in current-voltage characteristics) of each pixel of the group of pixels PX is faster than that of the deterioration monitoring. Note that details of the deterioration monitoring and the first high-speed monitoring will be described below with reference to FIGS. 8 to 10 and the like.

The data lines S(1) to S(M) are wiring lines for transmitting a gray-scale signal corresponding to an image signal from the source driver 30 to each pixel of the group of pixels PX in order to display an image. Also, the data lines S(1) to S(M) are also wiring lines that transmit a deterioration monitoring voltage that is an input signal to each pixel of the group of pixels PX and transmit a deterioration monitoring current that is an output signal from each pixel of the group of pixels PX to the source driver 30 when deterioration monitoring is executed. Furthermore, the data lines S(1) to S(M) are also wiring lines that transmit a predetermined voltage that is an input signal to each pixel of the group of pixels PX and transmit a first high-speed monitoring current that is an output signal from each pixel of the group of pixels PX to the source driver 30 when first high-speed monitoring is executed.

Note that the transmission of the image signal, the transmission of the deterioration monitoring voltage and the deterioration monitoring current, and the transmission of the first high-speed monitoring voltage and the first high-speed monitoring current do not need to be executed using the same wiring lines and different wiring lines may be used.

The gate driver 13 may be provided on a substrate included in the display panel 10, for example. Alternatively, the gate driver 13 may be provided outside the substrate included in the display panel 10. One end portion of each of the gate lines G1(1) to G1(N) and the monitor control lines G2(1) to G2(N) is connected to the gate driver 13. The gate driver 13 includes a shift register, a logic circuit, and the like, for example. The gate driver 13 drives the gate lines G1(1) to G1(N) and the monitor control lines G2(1) to G2(N) on the basis of a gate control signal GCTL output from the control unit 40.

The source driver 30 is connected to one end portion of each of the data lines S(1) to S(M). The source driver 30 drives the group of pixels PX via the data lines S(1) to S(M) on the basis of a source control signal SCTL output from the control unit 40. For example, when the source driver 30 receives the image signal VDa from the control unit 40, the source driver 30 supplies a gray-scale signal (gray-scale voltage) corresponding to the image signal VDa to each one of the data lines S(1) to S(M). Accordingly, each pixel of the group of pixels PX emits light, and an image is displayed in the display region 11.

When deterioration monitoring is executed, on the basis of an instruction signal from the control unit 40, the source driver 30 supplies a deterioration monitoring voltage to the data lines S(1) to S(M) and converts a deterioration monitoring current, which is an analog signal transmitted from each pixel of the group of pixels PX through the data lines S(1) to S(M), into a digital signal to output the digital signal to the control unit 40 as a deterioration monitoring current value Mo.

When first high-speed monitoring is executed, on the basis of an instruction signal from the control unit 40, the source driver 30 supplies a first high-speed monitoring voltage to the data lines S(1) to S(M) and converts a first high-speed monitoring current, which is an analog signal transmitted from each pixel of the group of pixels PX through the data lines S(1) to S(M), into a digital signal to output the digital signal to the control unit 40 as a first high-speed monitoring current value (first high-speed monitoring measurement value) FMo1.

A flash memory or the like can be used as the storage unit 50, for example. Note that the storage unit 50 is not limited to a flash memory and may be a semiconductor memory such as a static random access memory (SRAM), a dynamic random access memory (DRAM), a read only memory (ROM), or a solid state drive (SSD); a register; a magnetic storage device such as a hard disk drive (HDD); or an optical storage device such as an optical disk device.

The control unit 40 controls the operations of the gate driver 13 and the source driver 30 to display images in the display region 11, execute deterioration monitoring, and execute first high-speed monitoring. The control unit 40 controls the driving of the gate driver 13 by outputting the gate control signal GCTL to the gate driver 13. The control unit 40 controls the driving of the source driver 30 by outputting the source control signal SCTL to the source driver 30.

The control unit 40 includes, for example, an image processing unit that executes image processing and a timing controller that controls the operations of the gate driver 13 and the source driver 30. For example, the image processing unit can be configured using a large-scale integration (LSI) such as a graphics processing unit (GPU) or the like. For example, the timing controller can be configured using an LSI.

Here, the luminous efficiency of the group of pixels PX is reduced due to the effects of change in temperature, age deterioration, or the like. Thus, when the control unit 40 acquires the input image signal VDb, which is an image signal input from the outside, the control unit 40 executes deterioration compensation (that is, correction) on the input image signal VDb in accordance with the deterioration state of the luminous efficiency of the group of pixels PX and generates the image signal VDa to be supplied to the group of pixels PX. Then, the control unit 40 outputs the image signal VDa subjected to deterioration compensation to the source driver 30 and causes a gray-scale signal corresponding to the image signal VDa to be output from the source driver 30 to each pixel of the group of pixels PX.

Figure 2:
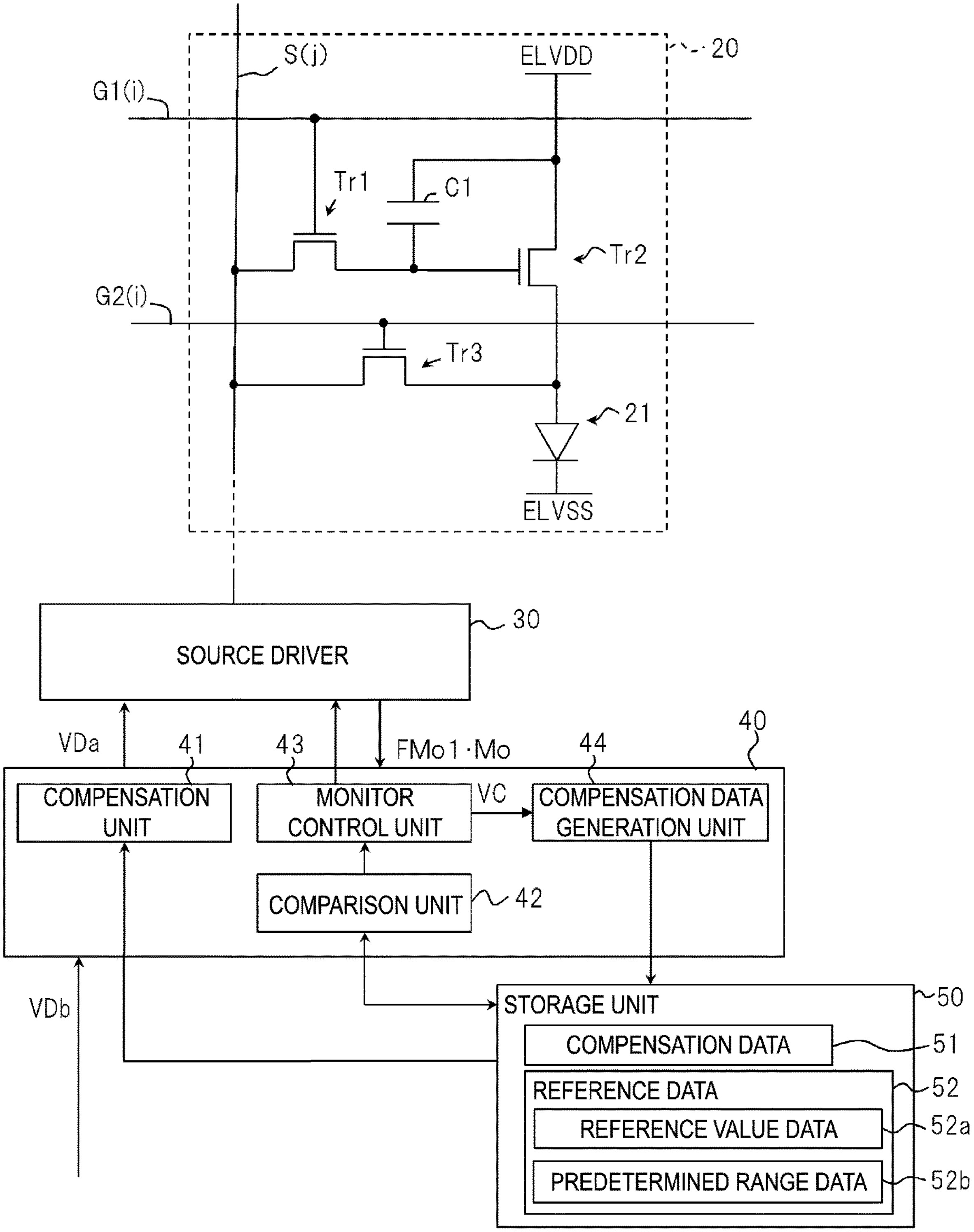
FIG. 2 is a diagram illustrating a schematic configuration of a pixel circuit, a source driver, and a control unit according to the embodiment.

FIG. 2 is a diagram illustrating a schematic configuration of the pixel circuit 20, the source driver 30, and the control unit 40 according to the embodiment. In FIG. 2, of the plurality of pixel circuits 20, the pixel circuit 20 of the i-th row and the j-th column is illustrated. For example, the pixel circuit 20 includes a light-emitting element 21, a capacitor C1, a selecting transistor Tr1, a drive transistor Tr2, and a monitor control transistor Tr3. The control unit 40 includes a compensation unit 41, a comparison unit 42, a monitor control unit 43, and a compensation data generation unit 44.

The light-emitting element 21 may be self-light-emitting element such as an organic light-emitting diode (OLED) or a quantum dot light-emitting diode (QLED), for example. Of the light-emitting element 21, the anode is connected to the source terminal of the drive transistor Tr2 and the drain terminal of the monitor control transistor Tr3, and the cathode is connected to a low-level power source line ELVSS.

Of the capacitor C1, one terminal is connected to a high-level power source line ELVDD and the drain terminal of the drive transistor Tr2, and the other terminal is connected to the drain terminal of the selecting transistor Tr1 and the gate terminal of the drive transistor Tr2.

The selecting transistor Tr1 is provided between the data line S(j), and the capacitor C1 and the gate terminal of the drive transistor Tr2. Of the selecting transistor Tr1, the gate terminal is connected to the gate line G1(*i*), the source terminal is connected to the data line S(j), and the drain terminal is connected to the gate terminal of the drive transistor Tr2 and the other terminal of the capacitor C1.

The drive transistor Tr2 is connected to the light-emitting element 21 in series. Of the drive transistor Tr2, the gate terminal is connected to the drain terminal of the selecting transistor Tr1 and the other terminal of the capacitor C1, the drain terminal is connected to the high-level power source line ELVDD and the other terminal of the capacitor C1, and the source terminal is connected to the anode of the light-emitting element 21 and the drain terminal of the monitor control transistor Tr3.

The monitor control transistor Tr3 is provided between the source terminal of the drive transistor Tr2 and the anode of the light-emitting element 21, and the data line S(j). Of the monitor control transistor Tr3, the gate terminal is connected to the monitor control line G2(*i*), the drain terminal is connected to the source terminal of the drive transistor Tr2 and the anode of the light-emitting element 21, and the source terminal is connected to the data line S(j).

For example, the storage unit 50 stores the compensation data 51 and reference data 52. The compensation data 51 is data for compensating for a decrease in the luminous efficiency of the group of pixels PX. Specifically, the compensation data 51 is data for executing deterioration compensation (that is, correction) on the input image signal VDb to obtain the image signal VDa. The compensation data 51 may be, for example, data representing a look-up table including information indicating the correspondence relationship between the input image signal VDb and the image signal Vda (correspondence relationship between the gray-scale voltage before and after correction) and may be data including information indicating an operation formula for obtaining the image signal Vda from the input image signal VDb (for example, a gray-scale voltage after correction from the input gray-scale voltage).

The reference data 52 is data for specifying an acceptable range for executing the deterioration monitoring. For example, it is sufficient that the reference data 52 can specify the acceptable range for executing the deterioration monitoring, and, for example, the reference data 52 may include reference value data 52*a* indicating a predetermined reference value and predetermined range data 52*b* indicating a predetermined range for specifying the acceptable range with respect to the reference value. For example, the reference value and the predetermined range are a value and a range that define an output current value from each pixel of the group of pixels PX with respect to a predetermined voltage with which the deterioration monitoring can be executed.

The compensation unit 41 executes deterioration compensation (that is, correction) on the input image signal VDb (image signal before deterioration compensation), which is an image signal input from the outside, using the compensation data 51 stored in the storage unit 50 to generate the image signal Vda that is deterioration-compensated. Then, the control unit 40 outputs the image signal Vda to the source driver 30.

The comparison unit 42 determines whether a first high-speed monitoring current value Fmo1 acquired from the source driver 30 by the control unit 40 is within the acceptable range in which the deterioration monitoring can be executed on the basis of the reference data 52 stored in the storage unit 50 and outputs the determination result to the monitor control unit 43.

The monitor control unit 43 outputs an instruction signal to the source driver 30 to execute the first high-speed monitoring and execute the deterioration monitoring. The timing at which the monitor control unit 43 executes the first high-speed monitoring and the deterioration monitoring is not particularly limited, and may be, for example, during an image display period, during a vertical blanking period, immediately after the display device 1 is powered on, or when the display device 1 is powered off. However, since the first high-speed monitoring is executed to determine whether the deterioration monitoring can be executed, the first high-speed monitoring is executed before the deterioration monitoring is executed.

When executing the first high-speed monitoring, the monitor control unit 43 supplies a predetermined voltage set in advance to the source driver 30. Accordingly, the control unit 40 obtains, from the source driver 30, the first high-speed monitoring current value Fmo1, which is the output current from the pixel circuit 20 when supplied with the predetermined voltage. In this manner, the control unit 40 can measure the current-voltage characteristics of the pixel circuit 20 (that is, the group of pixels PX) in a more simplified manner at a high speed. When the monitor control unit 43 acquires the determination result that the first high-speed monitoring current value Fmo1 is within the acceptable range in which the deterioration monitoring can be executed from the comparison unit 42, the monitor control unit 43 executes the deterioration monitoring. Also, when the monitor control unit 43 acquires the determination result that the first high-speed monitoring current value Fmo1 is not within the acceptable range in which the deterioration monitoring can be executed from the comparison unit 42, the monitor control unit 43 does not execute the deterioration monitoring and executes the first high-speed monitoring again or does not execute the first high-speed monitoring.

When the monitor control unit 43 executes the deterioration monitoring, the deterioration monitoring voltage is supplied to the source driver 30 a predetermined number of times (for example, an average number of times) for the whole one line of the monitor control line G2(*i*). Accordingly, the control unit 40 acquires the deterioration monitoring current value Mo, which is an output current from the pixel circuits 20 of the predetermined number of times (for example, an average number of times) for the whole one line of the monitor control line G2(*i*), from the source driver 30. Then, the monitor control unit 43 changes (sweeps) and supplies the deterioration monitoring voltage to the monitor control line G2(*i*) until the deterioration monitoring current value Mo, which is an average taken from all of the pixel circuits 20 connected to the one monitor control line G2(*i*), is equal to or greater than a predetermined current value. Then, the monitor control unit 43 acquires the deterioration monitoring voltage of the time when the deterioration monitoring current value Mo, which is an average taken from all of the pixel circuits 20 connected to the one monitor control line G2(*i*), is equal to or greater than the predetermined current value as the compensation voltage value VC. In this manner, the control unit 40 measures the current-voltage characteristics of the plurality of pixel circuits 20 (that is, the group of pixels PX) with a higher accuracy than the first high-speed monitoring. Then, the monitor control unit 43 outputs information indicating the acquired compensation voltage value VC to the compensation data generation unit 44.

Note that since the compensation voltage value VC changes in accordance with the decrease in the luminous efficiency of the plurality of pixel circuits 20 (that is, the group of pixels PX), the compensation voltage value VC can be expressed as data in which a decrease in the luminous efficiency of the plurality of pixel circuits 20 (that is, the group of pixels PX) has been detected.

When the compensation data generation unit 44 acquires the information indicating the compensation voltage value VC from the monitor control unit 43, the compensation data generation unit 44 generates the compensation data 51 on the basis of the compensation voltage value VC. Then, the compensation data generation unit 44 uses the generated compensation data 51 to update the compensation data 51 already stored in the storage unit 50 as new compensation data 51.

Note that as the method for updating the compensation data 51 already stored in the storage unit 50 by the compensation data generation unit 44, the compensation data 51 already stored in the storage unit 50 may be overwritten by the new compensation data 51 and stored or the new compensation data 51 may be stored in a different storage area from that of the compensation data 51 already stored in order to retain the compensation data 51 already stored.

Next, decrease in the luminous efficiency of the group of pixels PX and the deterioration compensation will be described using FIGS. 3 and 4.

Figure 3:
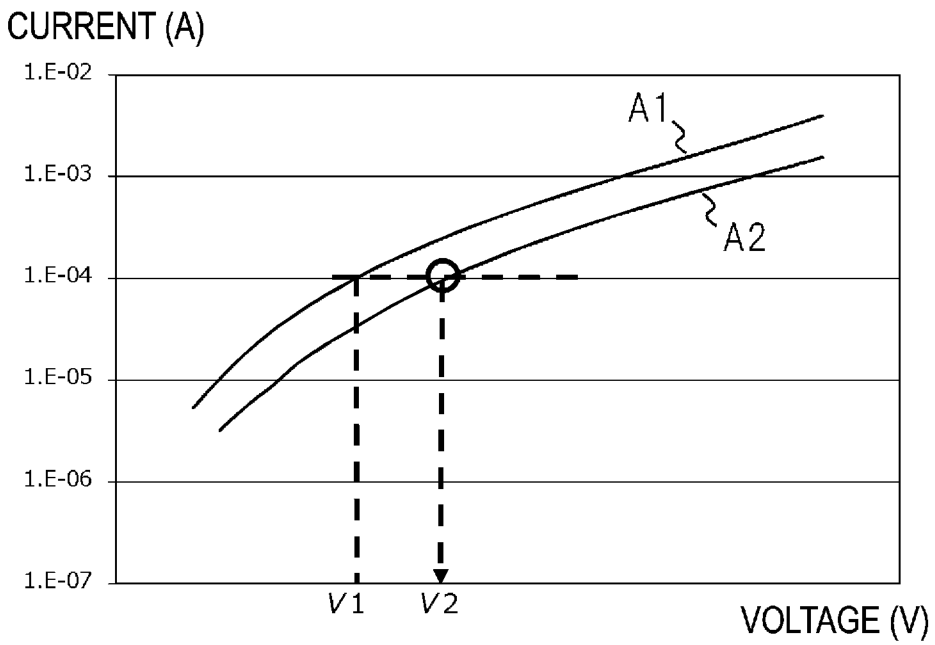
FIG. 3 is a diagram illustrating the current-voltage characteristics of pixels according to the embodiment.

FIG. 3 is a diagram illustrating the current-voltage characteristics of the pixels PX according to the embodiment. Note that in FIG. 3, in order to make it easy to understand the difference between before and after the deterioration of the low gray scale, the graph uses logarithmic notation on the vertical axis. As illustrated in FIG. 3, data A1 represents the current-voltage characteristics of the pixel PX before deterioration, and data A2 represents the current-voltage characteristics of the pixel PX after deterioration has occurred. As illustrated in FIG. 3, when the pixel PX deteriorates due to age deterioration or the like, current flows less easily. Thus, for the same current value to flow to the pixel PX after deterioration as the current value that flowed to the pixel PX before deterioration via a voltage V1 supplied to the pixel PX, a voltage V2 higher than the voltage V1 is required to be supplied to the pixel PX.

Figure 4:
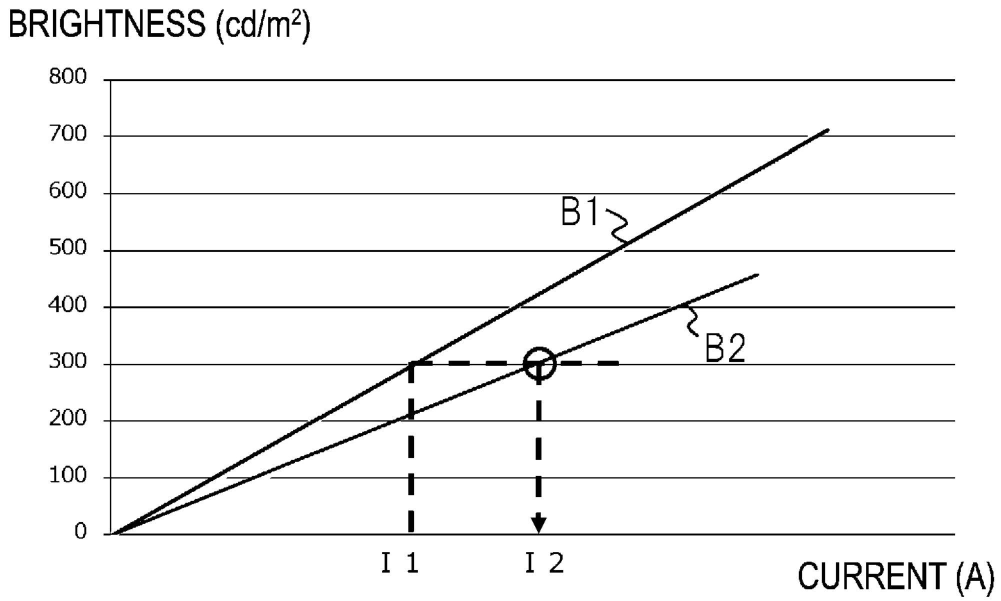
FIG. 4 is a diagram illustrating the current-brightness characteristics of the pixels according to the embodiment.

FIG. 4 is a diagram illustrating the current-brightness characteristics of the pixels PX according to the embodiment. As illustrated in FIG. 4, data B1 represents the current-brightness characteristics of the pixel PX before deterioration, and data B2 represents the current-brightness characteristics of the pixel PX after deterioration has occurred. As illustrated in FIG. 4, when the luminous efficiency is decreased due to the pixel PX deteriorating by age deterioration or the like, for the pixel PX after deterioration to emit light at the same brightness as the brightness obtained with a current I1 that flowed through the pixel PX before deterioration, a current I2 higher than the current I1 is required to be supplied to the pixel PX.

In order to determine the deterioration state of the pixel PX, the control unit 40 measures at least one of the following (1) to (3) in regard to the pixel circuit 20 in order to detect a decrease in the luminous efficiency of the group of pixels PX.

(1) The amount of decrease in the current flowing between the drain terminal and the source terminal of the drive transistor Tr2

(2) The amount of decrease in the current flowing through light-emitting element 21

(3) The amount of decrease in the luminous efficiency of light-emitting element 21

Regarding (1) and (2), by applying the deterioration monitoring voltage between the drain terminal and the source terminal of the drive transistor Tr2 of each pixel circuit 20 or the light-emitting element 21, the current value at that time can be obtained as the deterioration monitoring current value Mo, and the current-voltage characteristics of the drive transistor Tr2 and/or the light-emitting element 21 can be measured.

The amount of decrease in the luminous efficiency of the light-emitting element 21 in (3) can be deduced from the amount of decrease in the current flowing through the light-emitting element 21 indicated in (2). Note that in order to more reliably measure the amount of decrease in the luminous efficiency of the light-emitting element 21 in (3), for example, in the display panel 10, a brightness measurement sensor for measuring the brightness of the light emitted by the light-emitting element 21 may be provided in each pixel circuit 20, and the control unit 40 may measure the brightness of the light actually emitted by the light-emitting element 21.

Note that in the present specification, "the luminous efficiency of the pixel PX" includes (1) to (3) described above, and "the luminous efficiency of the light-emitting element 21" includes (3) described above but does not include (1) and (2) described above.

Figure 5:
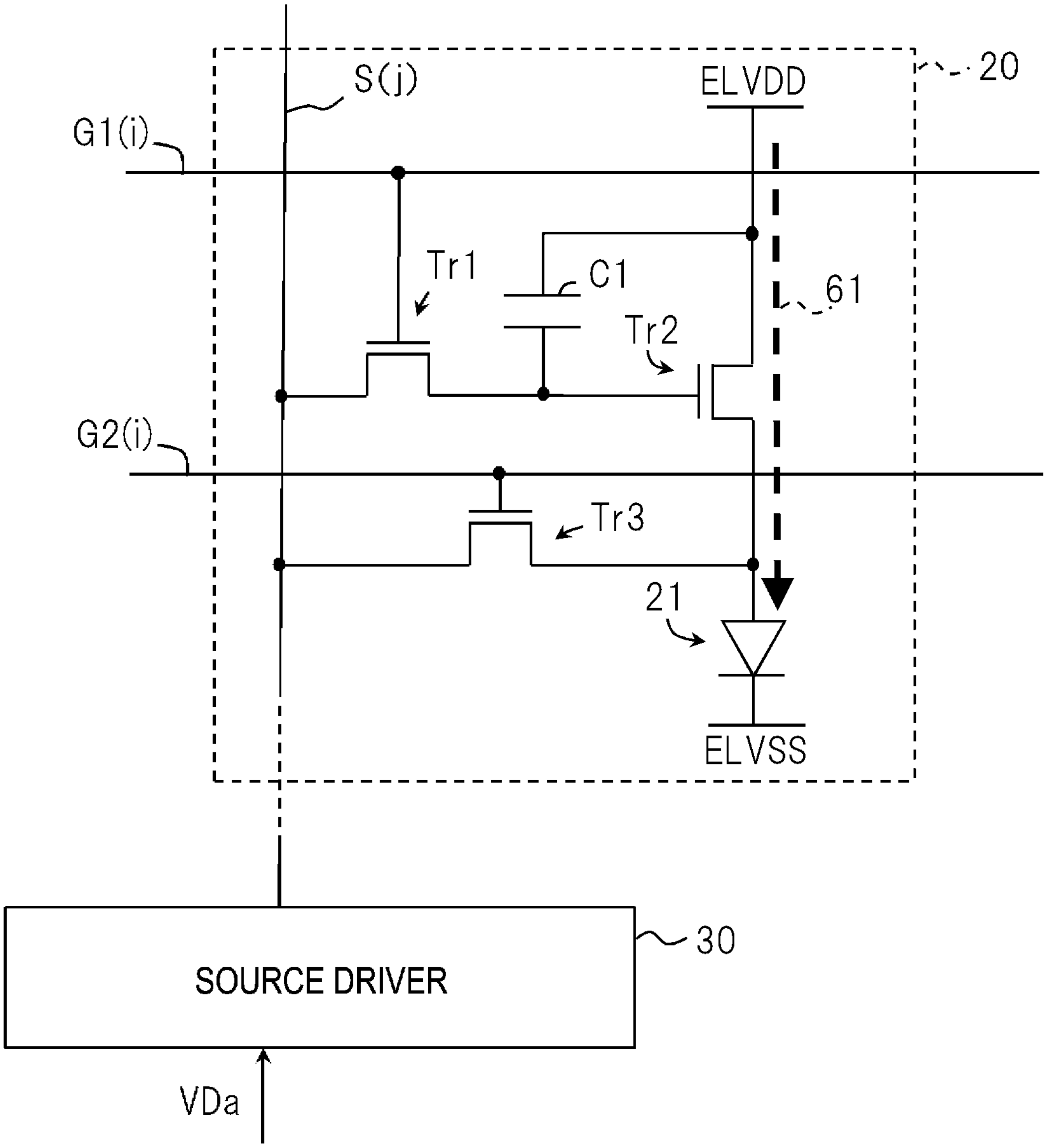
FIG. 5 is a diagram illustrating the operations of the pixel circuit when an image is displayed on the basis of an image signal during a gray-scale voltage writing period according to the embodiment.

Next, the operations of the pixel circuit 20 provided in the pixel PX will be described using FIGS. 5 to 7. FIG. 5 is a diagram illustrating the operations of the pixel circuit 20 when an image is displayed on the basis of the image signal Vda during a gray-scale voltage writing period (image display period) according to the embodiment. In other words, FIG. 5 illustrates the operations of the pixel circuit 20 when an image is displayed in the display region 11 instead of when the deterioration monitoring and the first high-speed monitoring are not being executed.

In the gray-scale voltage writing period, the gate line G1(*i*) is in an active state (selected state), and the monitor control line G2(*i*) is in a non-active state (non-selected state). This causes the selecting transistor Tr1 to be set to the off state and causes the monitor control transistor Tr3 to be set to the on state. In response to the image signal VDa, the data line S(j) is supplied with a gray-scale voltage corresponding to the target brightness of the light-emitting element 21. With this, the drive transistor Tr2 is set to the on state. As a result, a current 61 flows between the drain terminal and the source terminal of the drive transistor Tr2 and further between the anode and the cathode of the light-emitting element 21. Thus, the light-emitting element 21 emits light at the target brightness.

Figure 6:
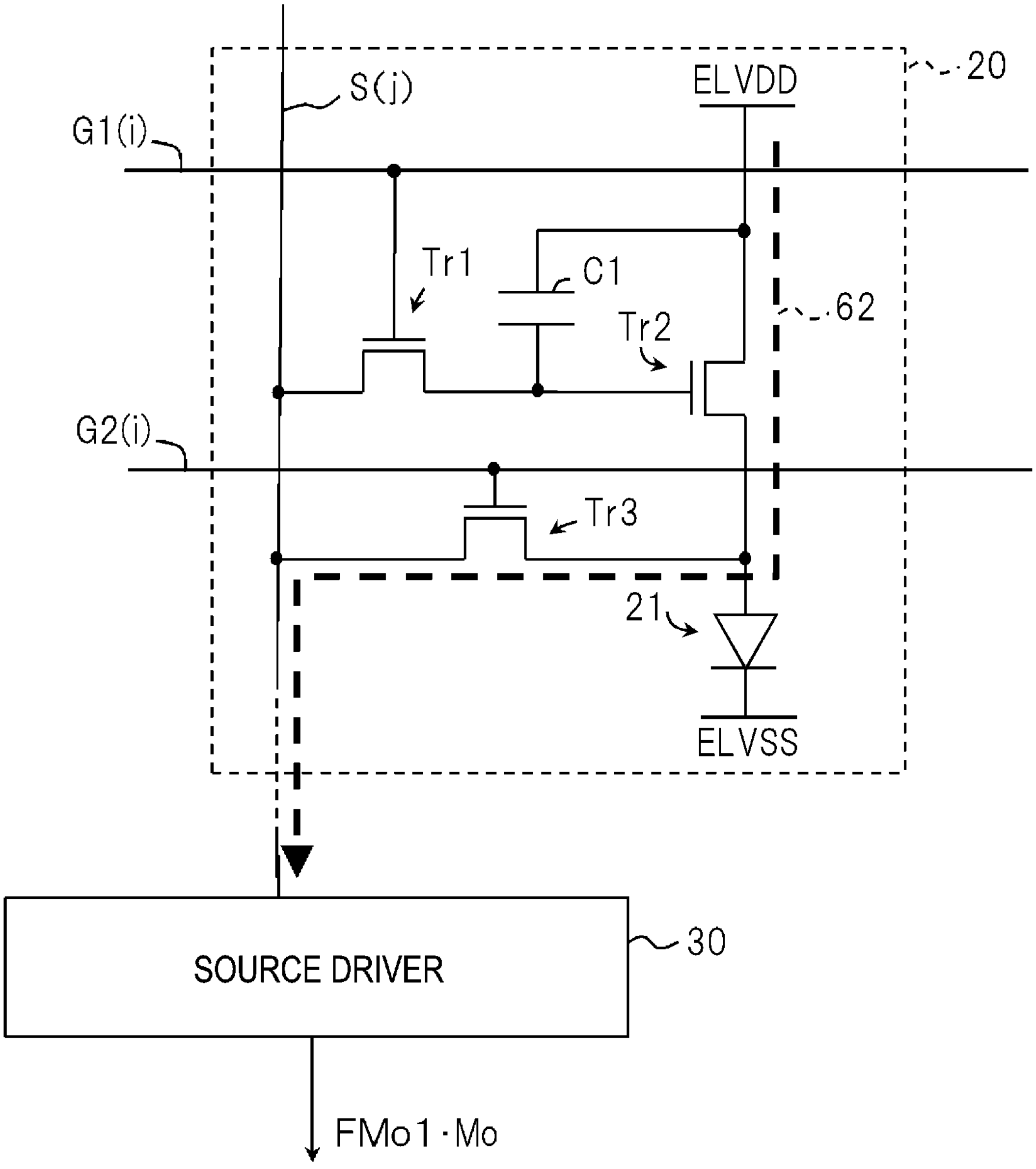
FIG. 6 is a diagram illustrating the operations of the pixel circuit when a current flowing between a drain terminal and a source terminal of a drive transistor is measured during execution of deterioration monitoring and execution of first high-speed monitoring.

FIG. 6 is a diagram illustrating the operations of the pixel circuit 20 when a current 62 flowing between the drain terminal and the source terminal of the drive transistor Tr2 is measured during execution of the deterioration monitoring and execution of the first high-speed monitoring.

When the deterioration monitoring is executed and when the first high-speed monitoring is executed, first, the gate line G1(*i*) is in an active state (selected state), and the monitor control line G2(*i*) is in a non-active state (non-selected state).

Then, when a deterioration monitoring voltage (when executing the deterioration monitoring) or a predetermined voltage (when executing the first high-speed monitoring) for measuring the current-voltage characteristics of the drive transistor Tr2 is supplied to the data line S(j) by the monitor control unit 43, the deterioration monitoring voltage (when executing the deterioration monitoring) or the predetermined voltage (when executing the first high-speed monitoring) charges the capacitor C1. With this, the drive transistor Tr2 is set to the on state.

Next, the gate line G1(*i*) is set to a non-active state (non-selected state), and the drive transistor Tr2 stays fixed in an on state. Then, the monitor control unit 43 stops the supply of the deterioration monitoring voltage (when executing the deterioration monitoring) or the predetermined voltage (when executing the first high-speed monitoring) supplied to the data line S(j). Then, the monitor control unit 43 switches the source driver 30 to a mode in which the current can be measured.

Next, the monitor control line G2(*i*) is set to an active state (selected state), and the monitor control transistor Tr3 is set to an on state. As a result, the current 62 flows between the drain terminal and the source terminal of the drive transistor Tr2, does not flow to the light-emitting element 21, but flows between the drain terminal and the source terminal of the monitor control transistor Tr3, and is supplied to the source driver 30 through the data line S(j). Then, the current 62 is measured by the source driver 30, and the control unit 40 obtains the deterioration monitoring current value Mo or the first high-speed monitoring current value FMo1 which is the measurement value of the current 62 measured by the source driver 30. In this manner, the deterioration monitoring current value Mo or the first high-speed monitoring current value FMo1 flowing between the drain terminal and the source terminal of the drive transistor Tr2 is obtained. In other words, the current-voltage characteristics between the drain terminal and the source terminal of the drive transistor Tr2 are measured.

Figure 7:
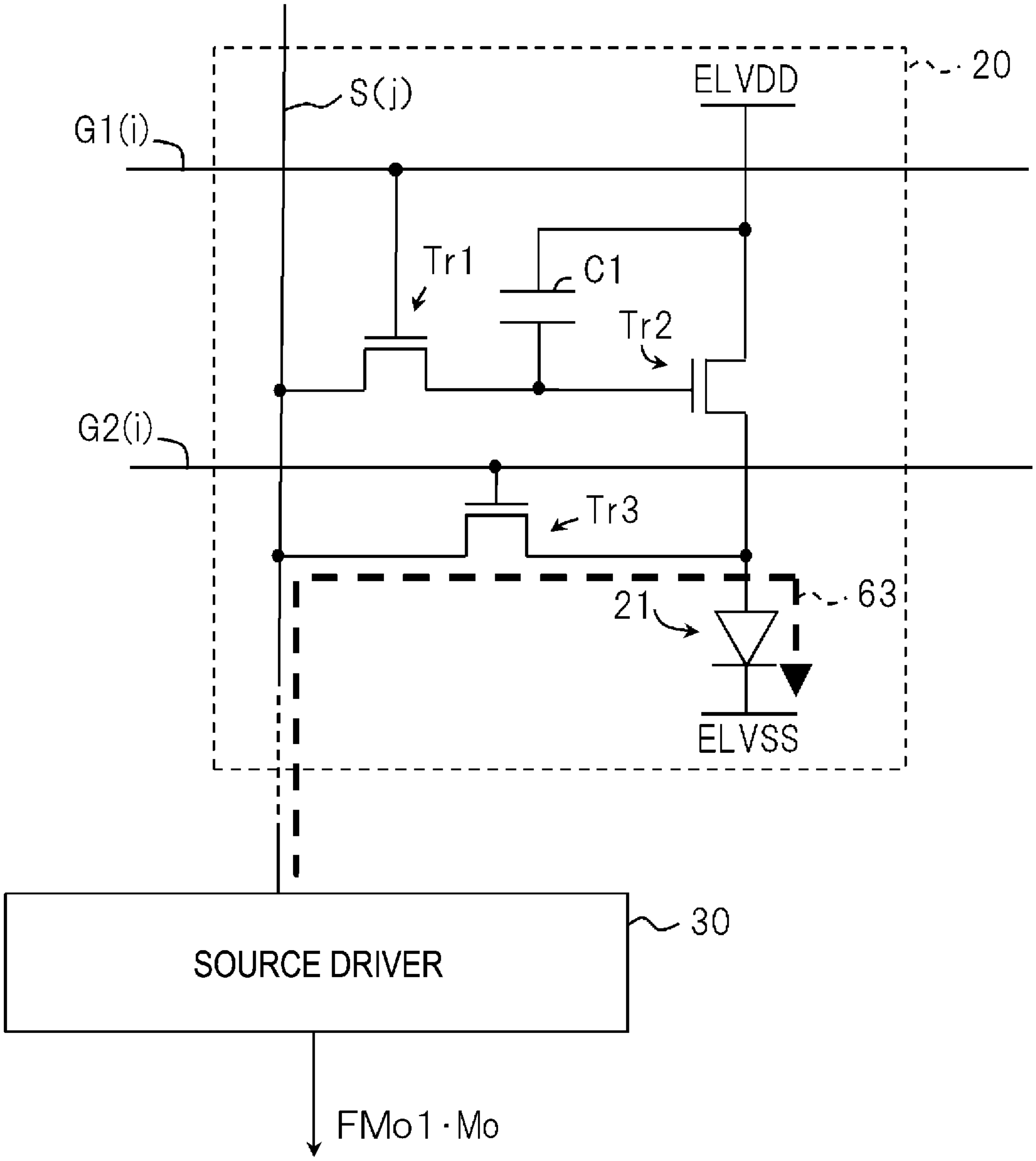
FIG. 7 is a diagram illustrating the operations of the pixel circuit when a current flowing through a light-emitting element is measured during execution of the deterioration monitoring and execution of the first high-speed monitoring.

FIG. 7 is a diagram illustrating the operations of the pixel circuit 20 when a current 63 flowing through the light-emitting element 21 is measured during execution of the deterioration monitoring and execution of the first high-speed monitoring.

When the deterioration monitoring is executed and when the first high-speed monitoring is executed, first, the gate line G1(*i*) is in an active state (selected state), and the monitor control line G2(*i*) is in a non-active state (non-selected state).

Then, when a voltage (for example, 0 V) for setting the drive transistor Tr2 to an off state is supplied to the data line S(j) by the monitor control unit 43, the drive transistor Tr2 is set to an off state.

Next, the gate line G1(*i*) is set to a non-active state (non-selected state), and the drive transistor Tr2 stays fixed in an off state. Then, the monitor control line G2(*i*) is set to an active state (selected state), and the monitor control transistor Tr3 is set to an on state.

When the deterioration monitoring voltage (when executing the deterioration monitoring) or the predetermined voltage (when executing the first high-speed monitoring) for measuring the current-voltage characteristics of the light-emitting element 21 is supplied to the data line S(j) by the monitor control unit 43, the current 63 flows from the source driver 30, between the source terminal and the drain terminal of the monitor control transistor Tr3, and between the anode and the cathode of the light-emitting element 21. Thus, the light-emitting element 21 emits light. Then, the current 63 is measured by the source driver 30, and the control unit 40 obtains the deterioration monitoring current value Mo or the first high-speed monitoring current value FMo1 which is the measurement value of the current 63 measured by the source driver 30. In this manner, the deterioration monitoring current value Mo or the first high-speed monitoring current value FMo1 flowing between the anode and the cathode of the light-emitting element 21 is obtained. In other words, the current-voltage characteristics of the light-emitting element 21 are measured.

During the execution of the first high-speed monitoring, it is sufficient that the control unit 40 measures at least one of the current-voltage characteristics between the drain terminal and the source terminal of the drive transistor Tr2 illustrated in FIG. 6 and the current-voltage characteristics of the light-emitting element 21 illustrated in FIG. 7 as the current-voltage characteristics of the group of pixels PX.

Note that during the execution of the deterioration monitoring, the current-voltage characteristics of the group of pixels PX are preferably obtained by the control unit 40 measuring both the current-voltage characteristics between the drain terminal and the source terminal of the drive transistor Tr2 illustrated in FIG. 6 and the current-voltage characteristics of the light-emitting element 21 illustrated in FIG. 7. In this manner, the current-voltage characteristics of the group of pixels PX can be more accurately obtained. Also, during the execution of the deterioration monitoring, the current-voltage characteristics of the group of pixels PX may be obtained by the control unit 40 measuring, of the current-voltage characteristics between the drain terminal and the source terminal of the drive transistor Tr2 illustrated in FIG. 6 and the current-voltage characteristics of the light-emitting element 21 illustrated in FIG. 7, only the current-voltage characteristics between the drain terminal and the source terminal of the drive transistor Tr2 illustrated in FIG. 6. In this manner, the measurement value of the current-voltage characteristics of the group of pixels PX can be obtained while suppressing light emission by the light-emitting element 21 and visibility thereof to a viewer when obtaining the current-voltage characteristics of the group of pixels PX.

Figure 8:
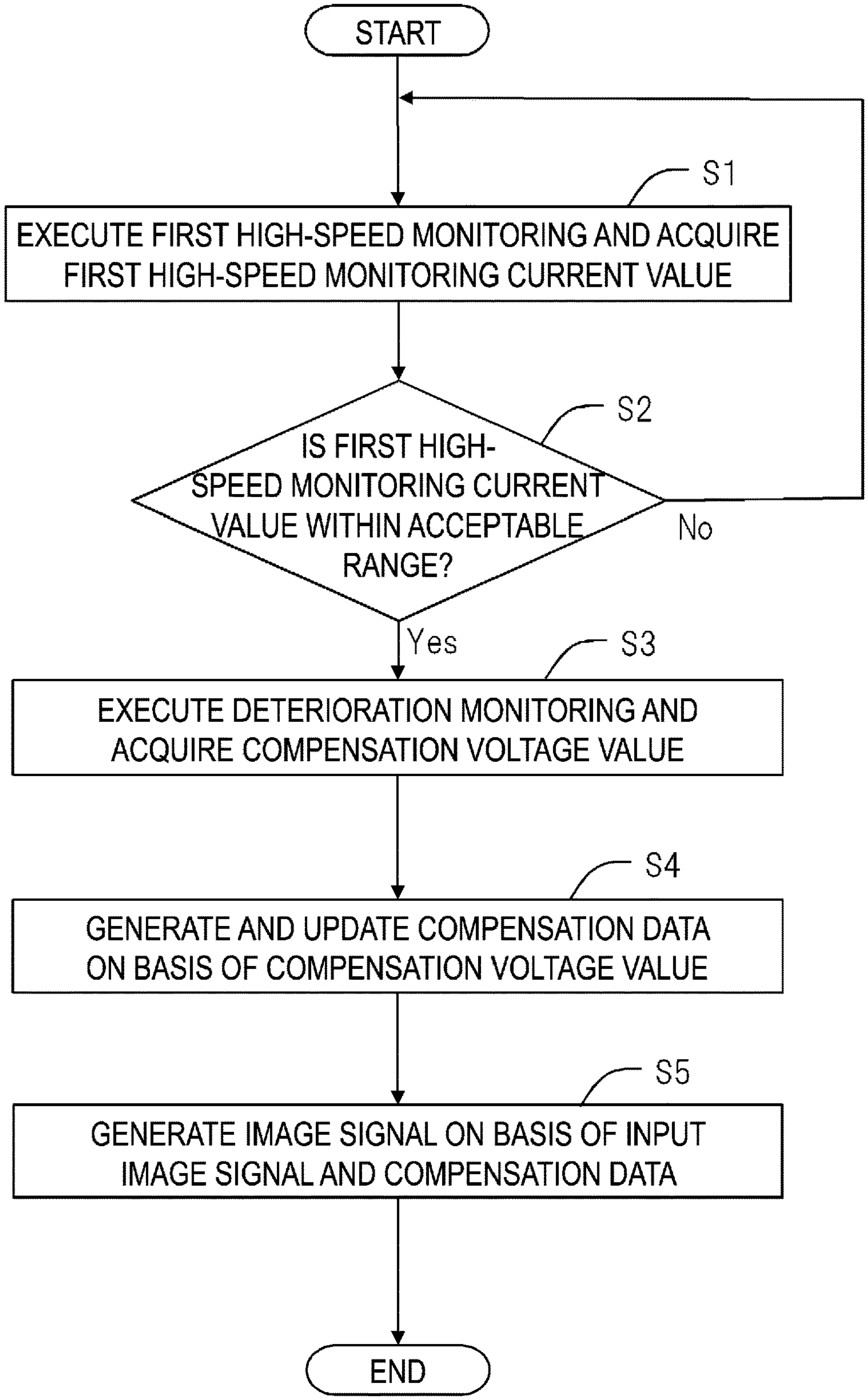
FIG. 8 is a diagram illustrating a schematic flow of the processing of the control unit until the image signal after the deterioration compensation is obtained from the first high-speed monitoring according to the embodiment.

Next, a schematic flow of the processing of the control unit 40 will be described with reference to FIGS. 1, 2, 8, and the like. FIG. 8 is a diagram illustrating a schematic flow of the processing of the control unit 40 until the image signal VDa after the deterioration compensation is obtained from the first high-speed monitoring according to the embodiment.

First, in step S1, the control unit 40 executes the processing for executing the first high-speed monitoring and acquiring the first high-speed monitoring current value FMo1. In other words, in step S1, the monitor control unit 43 executes the first high-speed monitoring to supply the predetermined voltage to each pixel circuit 20 via the source driver 30, and the control unit 40 acquires, via the source driver 30, the first high-speed monitoring current value FMo1, which is the output current value from all of the pixel circuits 20 connected to the monitor control lines G2(1) to G2(N) supplied with the predetermined voltage.

As described below in more detail using FIG. 9, in step S1, the first high-speed monitoring includes only supplying the predetermined voltage set in advance to all of the pixel circuits 20 connected to the monitor control lines G2(1) to G2(N) without changing the voltage to be supplied. Thus, the amount of time required from the start to the end of execution is less than that required by the deterioration monitoring in which the voltage is supplied to the pixel circuits 20 a plurality of times for sweeping the voltage to be supplied and the like. In this manner, the first high-speed monitoring is faster in terms of processing speed than the deterioration monitoring.

Next, in step S2, the comparison unit 42 references the reference data 52 stored in the storage unit 50 and determines whether the first high-speed monitoring current value FMo1 acquired from the source driver 30 by the control unit 40 is within the acceptable range.

Then, in step S2, in a case where the comparison unit 42 determines that the first high-speed monitoring current value FMo1 acquired from the source driver 30 is not within the acceptable range (No in step S2), the determination result is output to the monitor control unit 43. In a case where the determination result is acquired, the monitor control unit 43 can determine that the luminous efficiency of the group of pixels PX has temporarily changed greatly and the deterioration monitoring is in a nonexecutable state due to a change in temperature of the use environment of the display device 1 or the like, for example. Thus, the deterioration monitoring is not executed, and the processing returns to step S1 again. In other words, the processing returns to step S1, and the control unit 40 executes the first high-speed monitoring and acquires the first high-speed monitoring current value FMo1.

Note that in step S2, in a case where the comparison unit 42 determines that the first high-speed monitoring current value FMo1 is not within the acceptable range (No in step S2), the series of processing illustrated in FIG. 8 may be ended without returning to the processing of step S1. In addition, after the processing in the case of No in step S2 and the processing of step S1 is repeated a predetermined number of times, the series of processing illustrated in FIG. 8 may be ended.

Next, in step S2, in a case where the comparison unit 42 determines that the first high-speed monitoring current value FMo1 acquired from the source driver 30 is within the acceptable range (Yes in step S2), the determination result is output to the monitor control unit 43. In a case where the determination result is acquired, the monitor control unit 43 can determine that the change in the luminous efficiency of the group of pixels PX is within a range in which the deterioration monitoring can be executed. Thus, the monitor control unit 43 determines that the deterioration monitoring is in an executable state, and then in step S3, the control unit 40 executes the deterioration monitoring and acquires the compensation voltage value VC. Then, the monitor control unit 43 outputs information indicating the compensation voltage value VC to the compensation data generation unit 44.

Although described below in more detail using FIG. 10, for example, in step S3, the deterioration monitoring includes supplying the deterioration monitoring voltage an average number of times to each one line of the monitor control lines G2(1) to G2(N) and sweeping the supplied deterioration monitoring voltage until the deterioration monitoring current value Mo which is an average taken from all of the pixel circuits 20 in one line is equal to or greater than a predetermined current value. Thus, the amount of time required from the start to the end of execution is longer than that required by the first high-speed monitoring, but the accuracy for detecting a change in the luminous efficiency of the group of pixels PX is higher.

Next, in step S4, the compensation data generation unit 44 generates the compensation data 51 on the basis of the compensation voltage value VC acquired by the monitor control unit 43 and updates the compensation data 51 already stored in the storage unit 50 with the generated compensation data 51. Then, in step S5, the compensation unit 41 generates the image signal VDa on the basis of the input image signal VDb from the outside and the compensation data 51 stored in the storage unit 50.

In this manner, the display device 1 according to the present embodiment includes the display panel 10 including the group of pixels PX; the control unit 40; and the storage unit 50. In addition, the control unit 40 includes the monitor control unit 43 that can execute the deterioration monitoring for detecting a decrease in the luminous efficiency of the group of pixels PX and the first high-speed monitoring that is executed at a faster speed than the deterioration monitoring for determining whether to execute the deterioration monitoring. When the storage unit 50 stores the reference data 52 that specifies the acceptable range in which the deterioration monitoring can be executed and the monitor control unit 43 determines that the first high-speed monitoring current value (first high-speed monitoring measurement value) FMo1 obtained by the first high-speed monitoring is within the acceptable range specified by the reference data 52 (Yes in step S2), the deterioration monitoring is executed (step S3).

In this manner, with the display device 1 according to the present embodiment, before the deterioration monitoring is executed, the first high-speed monitoring that can be executed at a faster speed than the deterioration monitoring is executed, and in a case where the first high-speed monitoring current value FMo1 obtained by the first high-speed monitoring is within the acceptable range specified by the reference data 52, the deterioration monitoring can be determined to be in an executable state, and the deterioration monitoring is executed. In other words, according to the display device 1, whether the deterioration monitoring for detecting a decrease in the luminous efficiency of the group of pixels PX is in an executable state can be determined at a fast speed. As a result, according to the display device 1, execution of deterioration monitoring for detecting a decrease in the luminous efficiency of a group of pixels can be suppressed when the luminous efficiency of a group of pixels is in a temporary state of change due to a change in temperature of the use environment of the display device or the like. In this manner, the display device 1 can accurately generate the compensation data 51 and execute the deterioration compensation for the group of pixels PX.

Furthermore, the monitor control unit 43 generates the new compensation data 51 on the basis of the compensation voltage value (deterioration monitoring measurement value) VC obtained by executing the deterioration monitoring and updates the compensation data 51 stored in the storage unit 50 with the new compensation data 51 (step S4). Accordingly, since the compensation data 51 stored in the storage unit 50 is updated in accordance with the luminous efficiency (for example, the current-voltage characteristics) that change depending on the use state of the group of pixels PX, deterioration compensation for the group of pixels PX can be executed more accurately in accordance with the luminous efficiency of the group of pixels PX.

Next, the processing (processing of step S1 in FIG. 8) for executing the first high-speed monitoring and acquiring the first high-speed monitoring current value FMo1 and the processing (step S3 in FIG. 8) for executing the deterioration monitoring and acquiring the compensation voltage value VC will be described in detail using FIGS. 1, 2, 9, 10, and the like.

Figure 9:
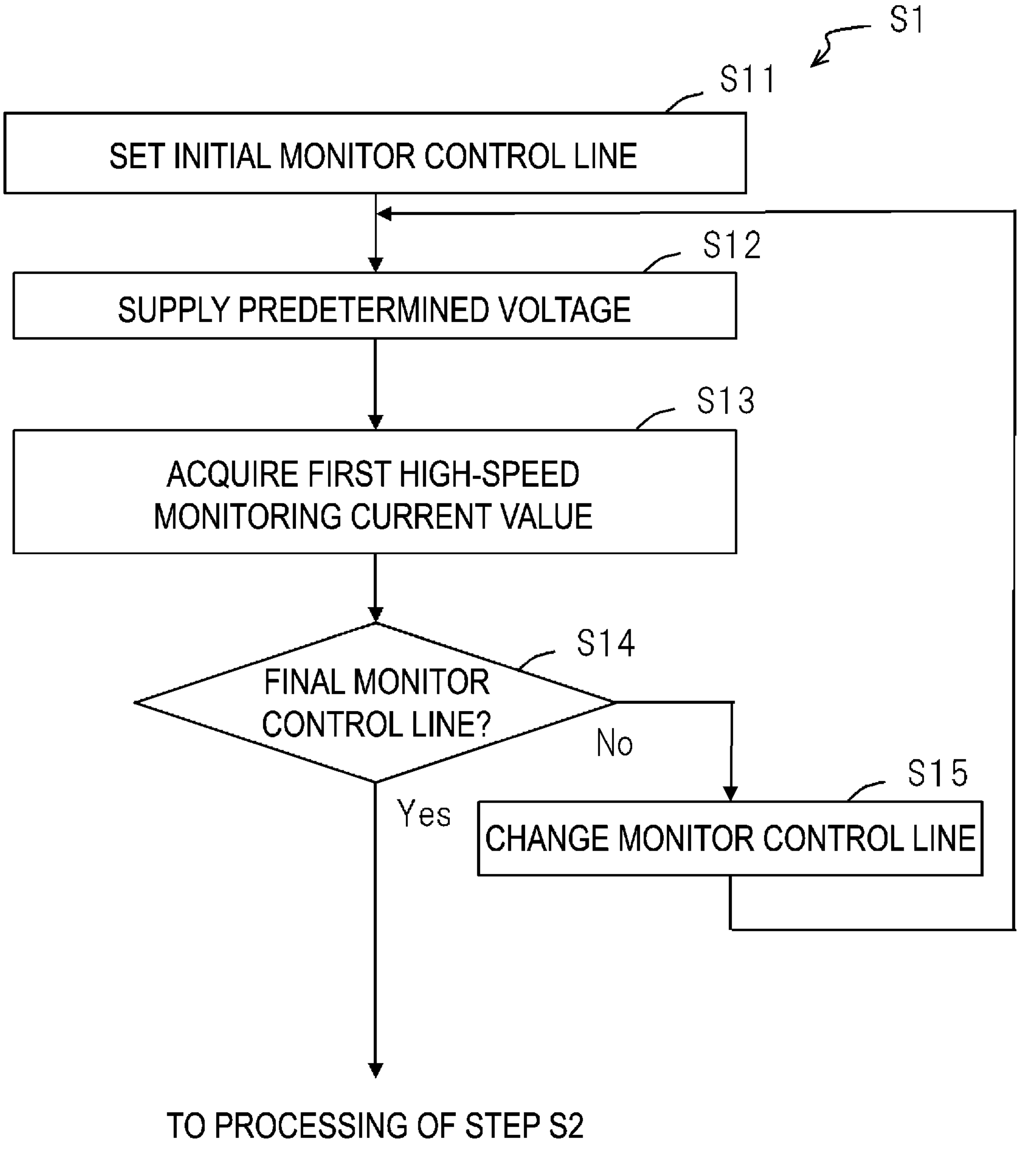
FIG. 9 is a diagram illustrating a schematic flow of the processing for executing the first high-speed monitoring and acquiring a first high-speed monitoring current value according to the embodiment.

FIG. 9 is a diagram illustrating a schematic flow of the processing (processing of step S1 in FIG. 8) for executing the first high-speed monitoring and acquiring the first high-speed monitoring current value FMo1 according to the embodiment. First, in step S11, the monitor control unit 43 sets the initial monitor control line to start the first high-speed monitoring from among the monitor control lines G2(1) to G2(N). For example, the monitor control unit 43 sets, from among the monitor control lines G2(1) to G2(N), the monitor control line G2(1) provided on one end as the initial monitor control line to start the first high-speed monitoring.

Next, in step S12, the monitor control unit 43 supplies a predetermined voltage set in advance to the set monitor control line (for example, the monitor control line G2(1)) via the source driver 30.

Then, in step S13, the control unit 40 acquires the first high-speed monitoring current value FMo1, which is the output current from all of the pixels PX connected to the monitor control line (for example, the monitor control line G2(1)) supplied with the predetermined voltage. Accordingly, the control unit 40 acquires the first high-speed monitoring current value FMo1 from all of the pixels PX of the one set monitor control line (for example, the monitor control line G2(1)).

Next, in step S14, the monitor control unit 43 determines whether the set monitor control line (for example, the monitor control line G2(1)) is the final monitor control line (for example, the monitor control line G2(N)). In step S14, when the monitor control unit 43 determines that the set monitor control line (for example, the monitor control line G2(1)) is not the final monitor control line (for example, the monitor control line G2(N) provided at the other end) (No in step S14), next, in step S15, the monitor control line is changed by the gate driver 13 selecting the monitor control line (for example, the monitor control line G2(2)) adjacent thereto, and the processing returns to step S12. Then, the supplying of the predetermined voltage to each line and the acquiring of the first high-speed monitoring current value FMo1 from all of the pixels PX connected to the one monitor control line are repeated until the final monitor control line (for example, the monitor control line G2(N) provided at the other end) is reached via the processing of steps S12, S13, the processing in the case of No in step S14, and the processing of step S15.

Then, in step S14, when the monitor control unit 43 determines that the set monitor control line (for example, the monitor control line G2(N) provided at the other end) is the final monitor control line (Yes in step S14), the monitor control unit 43 ends the execution of the first high-speed monitoring, and the processing proceeds to step S2 (see FIG. 8).

In this manner, in the first high-speed monitoring, the control unit 40 supplies a predetermined voltage, which is a common voltage set in advance, to each line of the monitor control lines G2(1) to G2(N) and acquires the first high-speed monitoring current value FMo1 of each line. Accordingly, in the first high-speed monitoring, since the voltage supplied to the monitor control lines G2(1) to G2(N) is not changed, the processing can be executed at a faster speed than in the deterioration monitoring.

For example, in a case where the frame frequency of the display device 1 is 60 Hz and the first high-speed monitoring is executed in the image display period, the amount of time required per one line is approximately 16.67 msec. This is because it is necessary to supply the predetermined voltage and acquire the first high-speed monitoring current value FMo1 in the blanking period between frames for each line.

For example, when the number of lines of the monitor control lines G2(1) to G2(N) is 720 lines, the amount of time required from the start to the end of execution of the first high-speed monitoring for all of the lines is approximately 12 seconds.

Figure 10:
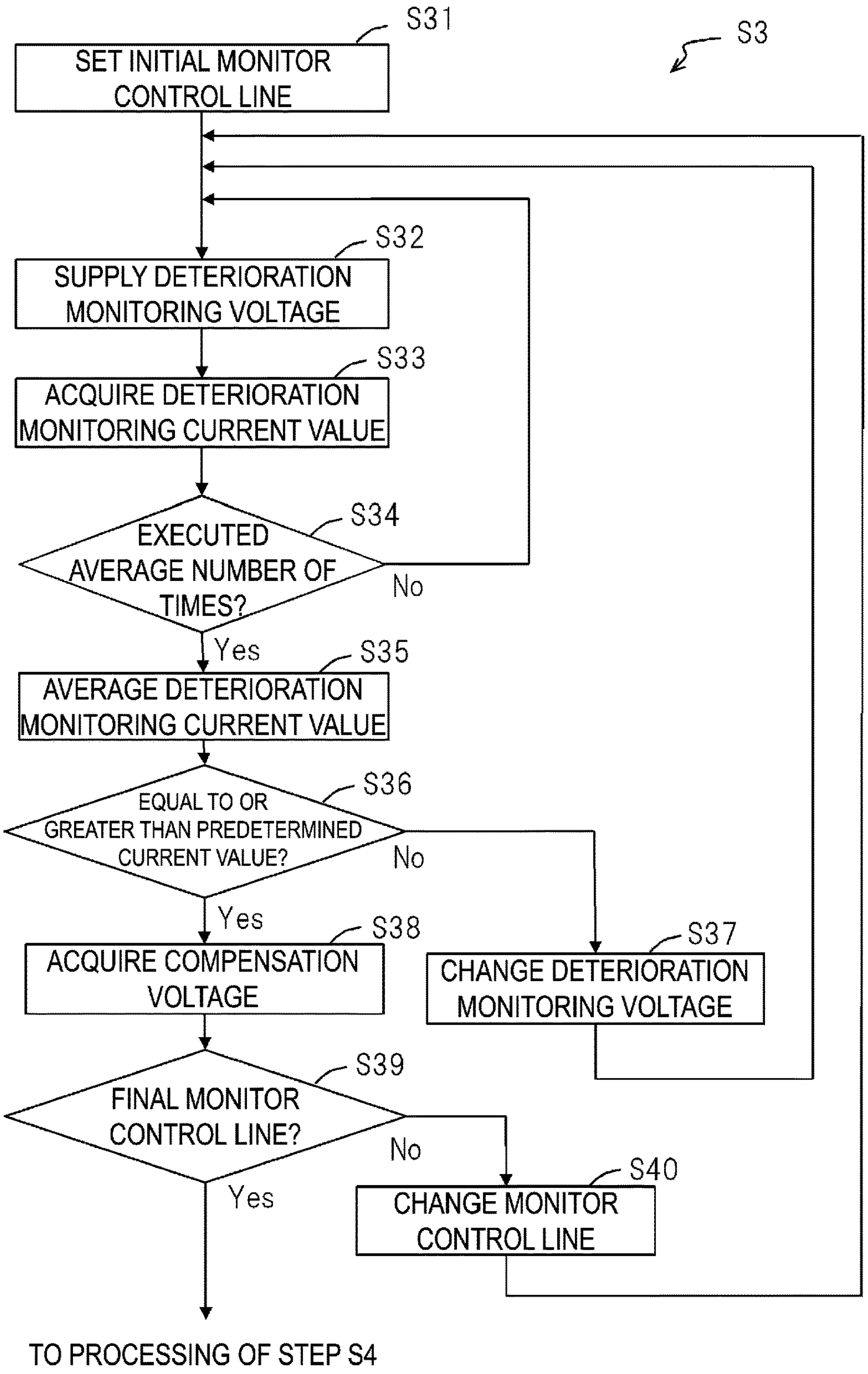
FIG. 10 is a diagram illustrating a schematic flow of the processing for executing the deterioration monitoring and acquiring a compensation voltage value according to the embodiment.

FIG. 10 is a diagram illustrating a schematic flow of the processing (processing of step S3 in FIG. 8) for executing the deterioration monitoring and acquiring the compensation voltage value VC according to the embodiment. After Yes is determined in step S2 (see FIG. 8), next, in step S31, the monitor control unit 43 sets the initial monitor control line to start the deterioration monitoring from among the monitor control lines G2(1) to G2(N). For example, the monitor control unit 43 sets, from among the monitor control lines G2(1) to G2(N), the monitor control line G2(1) provided on one end as the initial monitor control line to start the deterioration monitoring.

Next, in step S32, the monitor control unit 43 supplies a deterioration monitoring voltage to the set monitor control line (for example, the monitor control line G2(1)) via the source driver 30. The deterioration monitoring voltage before the sweeping that is initially supplied may be set in advance or may be set reflecting the result of the previous deterioration monitoring.

Then, in step S33, the control unit 40 acquires the deterioration monitoring current value Mo, which is the output current from all of the pixels PX connected to the monitor control line (for example, the monitor control line G2(1)) supplied with the deterioration monitoring voltage. Accordingly, the control unit 40 acquires the deterioration monitoring current value Mo from all of the pixels PX of the one set monitor control line (for example, the monitor control line G2(1)).

Next, in step S34, the monitor control unit 43 determines whether the deterioration monitoring has been executed an average number of times set in advance per the one set monitor control line (for example, the monitor control line G2(1)). In step S34, in a case where the monitor control unit 43 determines that the deterioration monitoring has not been executed an average number of times set in advance per the one set monitor control line (for example, the monitor control line G2(1)) (No in step S34), the processing returns to step S32. Then, via the processing of steps S32 and S33 and the processing in a case where No is determined in step S34, the control unit 40 supplies the deterioration monitoring voltage and acquires the deterioration monitoring current value Mo an average number of times set in advance per the one set monitor control line (for example, the monitor control line G2(1)).

Then, in step S34, in a case where the monitor control unit 43 determines that the deterioration monitoring has been executed an average number of times set in advance per the one set monitor control line (for example, the monitor control line G2(1)) (Yes in step S34), next, in step S35, the monitor control unit 43 finds the average of the acquired deterioration monitoring current values Mo of all of the pixels PX connected to the one set monitor control line (for example, the monitor control line G2(1)).

Then, in step S36, the monitor control unit 43 determines whether the averaged deterioration monitoring current value Mo of all of the pixels PX connected to the one set monitor control line (for example, the monitor control line G2(1)) is equal to or greater than a predetermined current value. Note that in step S36, the deterioration monitoring voltage of the pixel PX, from among all of the pixels PX connected to the one set monitor control line (for example, the monitor control line G2(1)), with the averaged deterioration monitoring current value Mo equal to or greater than the predetermined current value is stored in a temporary line memory or the like as a candidate value for the compensation voltage value.

In step S36, in a case where the monitor control unit 43 determines that the averaged deterioration monitoring current value Mo of all of the pixels PX connected to the one set monitor control line (for example, the monitor control line G2(1)) is not equal to or greater than the predetermined current value (No in step S36), in step S37, the monitor control unit 43 changes the deterioration monitoring voltage or in other words sweeps the deterioration monitoring voltage. For example, the monitor control unit 43 increases the voltage of the deterioration monitoring voltage. Note that in a case where the voltage of the deterioration monitoring is increased, the candidate value for the compensation voltage value already temporarily stored in the line memory for the pixel PX with a current value equal to or greater than the predetermined current value is not updated and left unchanged. Next, the processing returns to step S32, and the monitor control unit 43 supplies the deterioration monitoring voltage changed in step S37 to the set monitor control line (for example, the monitor control line G2(1)) via the source driver 30. Then, the processing of steps S32 to S37 for changing the deterioration monitoring voltage or in other words sweeping the deterioration monitoring voltage is repeated until the averaged deterioration monitoring current value Mo of all of the pixels PX connected to the one set monitor control line (for example, the monitor control line G2(1)) is equal to or greater than the predetermined current value.

Then, in step S36, in a case where the monitor control unit 43 determines that the averaged deterioration monitoring current value Mo of all of the pixels PX connected to the one set monitor control line (for example, the monitor control line G2(1)) is equal to or greater than the predetermined current value (Yes in step S36), next, in step S38, the monitor control unit 43 stores the candidate value for the compensation voltage value temporarily stored in the line memory in the storage unit 50 or the like as the compensation voltage value VC. Accordingly, the monitor control unit 43 acquires the compensation voltage value VC per the one set monitor control line (for example, the monitor control line G2(1)).

Then, in step S39, the monitor control unit 43 determines whether the set monitor control line (for example, the monitor control line G2(1)) is the final monitor control line (for example, the monitor control line G2(N)). In step S39, when the monitor control unit 43 determines that the set monitor control line (for example, the monitor control line G2(1)) is not the final monitor control line (for example, the monitor control line G2(N)) (No in step S39), next, in step S40, the monitor control line is changed by the gate driver 13 selecting the monitor control line (for example, the monitor control line G2(2)) adjacent thereto, and the processing returns to step S32. Then, via the processing of steps S32 to S38, the processing in the case of No in step S39, and the processing of step S40, the supplying of the deterioration monitoring voltage swept an average number of times and the acquiring of the compensation voltage value VC on the basis of the deterioration monitoring current value Mo from the pixel circuits 20 for each line is repeated until the final monitor control line (for example, the monitor control line G2(N)) is reached.

Then, in step S39, when the monitor control unit 43 determines that the set monitor control line (for example, the monitor control line G2(N)) is the final monitor control line (Yes in step S39), the monitor control unit 43 ends the execution of the deterioration monitoring, and the processing proceeds to step S4 (see FIG. 8).

In this manner, in the deterioration monitoring, the control unit 40 supplies the deterioration monitoring voltage an average number of times to each line of the monitor control lines G2(1) to G2(N) and acquires the deterioration monitoring current value Mo an average number of times. Then, the control unit 40 repeatedly changes and supplies the deterioration monitoring voltage to each line of the monitor control lines G2(1) to G2(N) until the average value of the deterioration monitoring current values Mo of all of the pixel circuits 20 is equal to or greater than the predetermined current value. Thus, the compensation voltage value VC is acquired for each line of the monitor control lines G2(1) to G2(N).

As described above, in the deterioration monitoring, the number of times the voltage is supplied to the monitor control lines G2(1) to G2(N), that is the number of times the current-voltage characteristics of each pixel of the group of pixels PX is measured, is more than in the first high-speed monitoring. Thus, the amount of time required from the start to the end of execution is longer, but measurement of the current-voltage characteristics (detection of a decrease in the luminous efficiency of the group of pixels PX) can be accurately executed.

For example, in a case where the frame frequency of the display device 1 is 60 Hz and the deterioration monitoring is executed in the image display period, the amount of time required per one line is approximately 16.67 msec. This is because, as in the first high-speed monitoring, it is necessary to supply the deterioration monitoring voltage and acquire the compensation voltage value VC in the blanking period between frames for each line.

For example, the average number of times for each line of the monitor control lines G2(1) to G2(N) is set to eight times, and the number of times the deterioration monitoring voltage is swept is set to twelve. In addition, the number of lines of the monitor control lines G2(1) to G2(N) is set to 720. In this case, the amount of time required from the start to the end of execution of the deterioration monitoring for all of the lines is approximately 19.2 minutes. As described above, since the amount of time required from the start to the end of the execution of the first high-speed monitoring for all of the lines is approximately 12 seconds, it can be seen that the first high-speed monitoring is faster than the deterioration monitoring.

Note that as another method, the following method may be used in the case of a configuration in which the supply voltage can be changed for each pixel of all of the pixels PX connected to the one set monitor control line (for example, the monitor control line G2(1)). That is, in step S36, for the pixel PX with the averaged deterioration monitoring current value Mo that is equal to or greater than the predetermined current value, in step S37, the deterioration monitoring voltage is not increased, and the deterioration monitoring voltage is increased only for the pixels PX which are not equal to or greater than the predetermined current value. Then, the processing of steps S32 to S37 for changing the deterioration monitoring voltage or in other words sweeping the deterioration monitoring voltage is repeated until the averaged deterioration monitoring current value Mo of all of the pixels PX connected to the one set monitor control line (for example, the monitor control line G2(1)) is equal to or greater than the predetermined current value, and the deterioration monitoring voltage set at the point in time when all of the pixels PX connected to the one set monitor control line (for example, the monitor control line G2(1)) are equal to or greater than the predetermined current value is stored in the storage unit 50 or the like as the compensation voltage value VC.

Note that in step S37, since there is a current variation (including image sticking, for example) in each of the plurality of pixels PX, the number of times of sweeping the deterioration monitoring voltage is different for each of the plurality of monitor control lines.

The processing contents and processing times of the deterioration monitoring and the first high-speed monitoring described above are merely examples and are not limited to the examples described above.

In this manner, in the first high-speed monitoring, the monitor control unit 43 measures the current-voltage characteristics of the group of pixels PX, that is, supplies the predetermined voltage and acquires the first high-speed monitoring current value (first high-speed monitoring measurement value) FMo1, a fewer number of times than in the deterioration monitoring. In the example described using FIG. 9, the supplying of the predetermined voltage and the acquiring of the first high-speed monitoring current value FMo1 are executed only once for each line of the monitor control lines G2(1) to G2(N). Thus, it is possible to quickly determine whether the deterioration monitoring is in an executable state.

Figure 11:
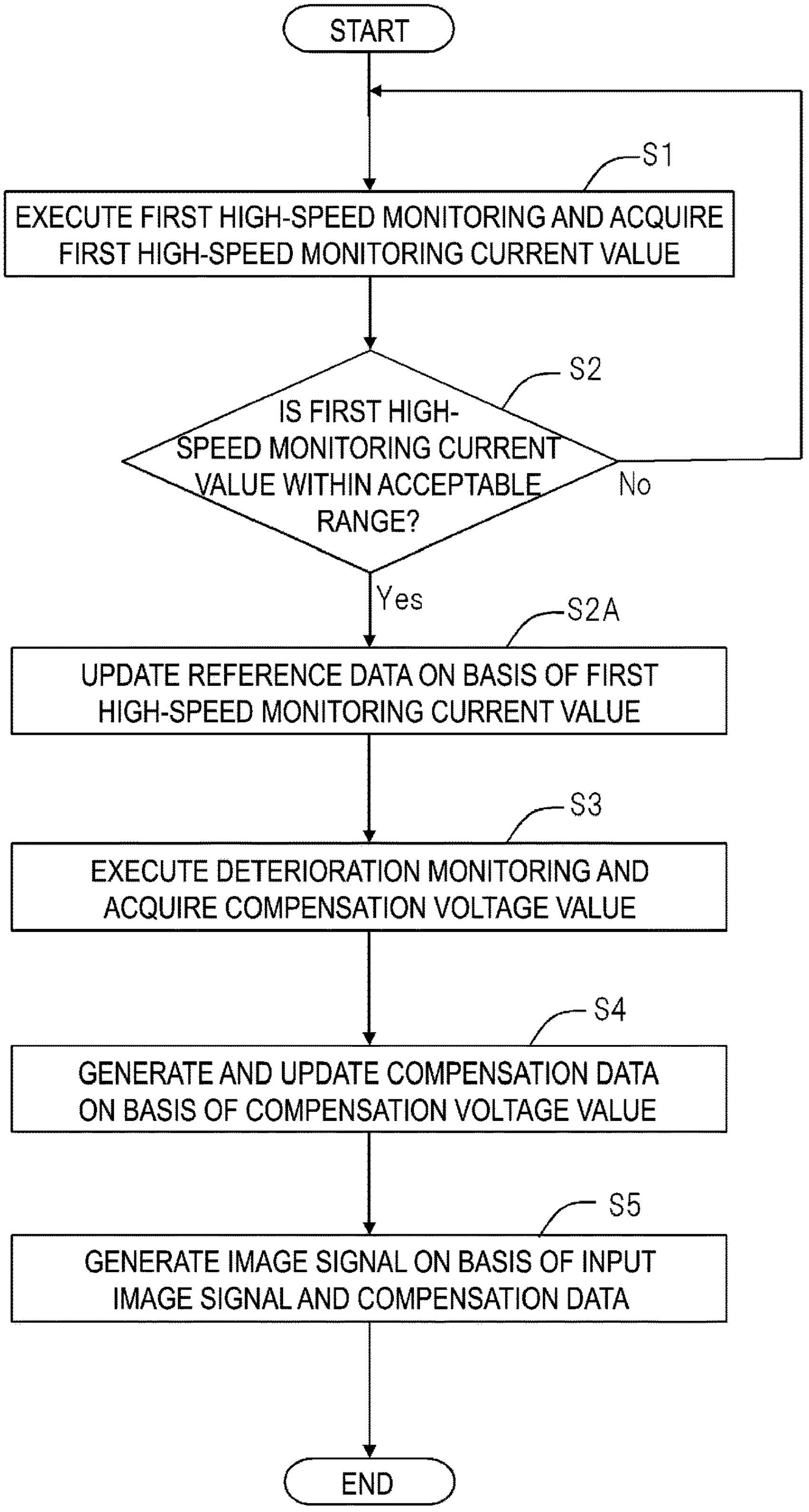
FIG. 11 is a diagram illustrating a schematic flow of the processing of the control unit according to a first modified example of the embodiment.

FIG. 11 is a diagram illustrating a schematic flow of the processing of the control unit 40 according to a first modified example of the embodiment. The control unit 40 may update the reference data 52 stored in the storage unit 50 on the basis of the first high-speed monitoring current value FMo1.

The control unit 40 executes the processing of step S1 and step S2 described above using FIG. 8 and the like. In step S2, in a case where the comparison unit 42 determines that the first high-speed monitoring current value FMo1 acquired from the source driver 30 is within the acceptable range (Yes in step S2), the determination result is output to the monitor control unit 43, and further in step S2A, the reference data 52 stored in the storage unit 50 is updated on the basis of the first high-speed monitoring current value FMo1 determined to be within the acceptable range. Specifically, for example, the comparison unit 42 updates the reference value data 52*a* indicating a predetermined reference value and the predetermined range data 52*b* indicating a predetermined range for specifying an acceptable range with respect to the reference value, both stored in the storage unit 50. Thereafter, the control unit 40 executes the processing of steps S3 to S5 described using FIG. 8, and the series of processing ends.

Note that it is sufficient that the timing at which the processing of step S2A is executed is after the processing in the case of Yes in step S2 and is not limited to being before step S3. The processing of step S2A may be executed between steps S3 and S4, between steps S4 and S5, or after step S5.

In this manner, the comparison unit 42 updates the reference data 52 stored in the storage unit 50 on the basis of the first high-speed monitoring current value FMo1 if the first high-speed monitoring current value (first high-speed monitoring measurement value) FMo1 is within the acceptable range in which the deterioration monitoring can be executed. Accordingly, since the reference data 52 stored in the storage unit 50 is updated in accordance with the luminous efficiency (for example, the current-voltage characteristics) that change depending on the use state of the group of pixels PX, the comparison unit 42 can more accurately determine whether the deterioration monitoring is executable.

Note that as the method for updating the reference data 52 already stored in the storage unit 50 by the comparison unit 42, the reference data 52 already stored in the storage unit 50 may be overwritten by the new reference data 52 and stored or the new reference data 52 may be stored in a different storage area to the reference data 52 already stored in order to retain the reference data 52 already stored.

Figure 12:
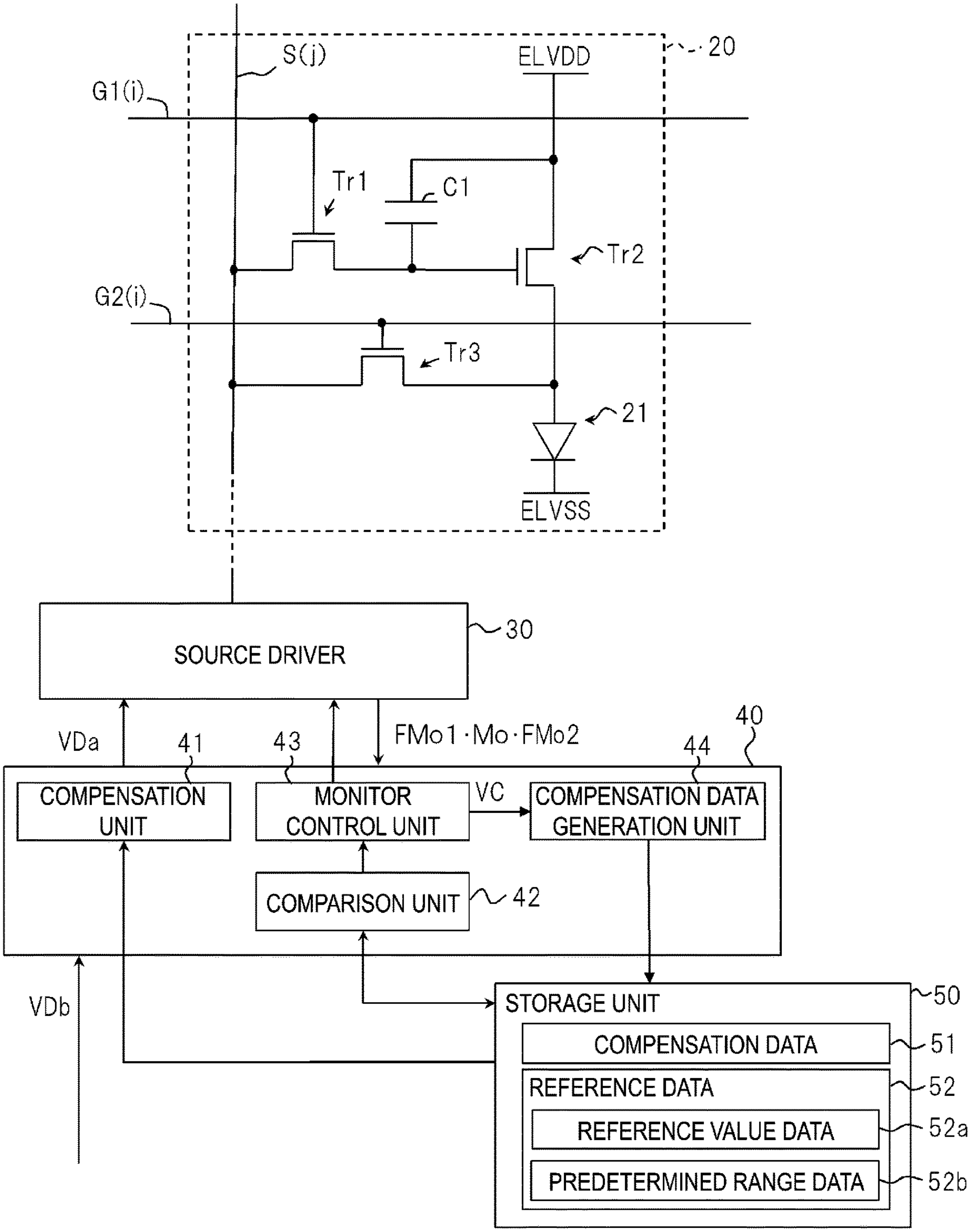
FIG. 12 is a diagram illustrating a schematic configuration of the display device according to a second modified example of the embodiment.

FIG. 12 is a diagram illustrating a schematic configuration of a pixel circuit, a source driver, and a control unit according to a second modified example of the embodiment. The control unit 40 may execute the high-speed monitoring twice, before and after the execution of the deterioration monitoring, and may update the compensation data 51 stored in the storage unit 50 in accordance with a result obtained by comparing the results of the two high-speed monitorings. As illustrated in FIG. 12, when the monitor control unit 43 executes a second in order second high-speed monitoring, the control unit 40 acquires a second high-speed monitoring current value (second high-speed monitoring measurement value) FMo2 from the source driver 30.

Figure 13:
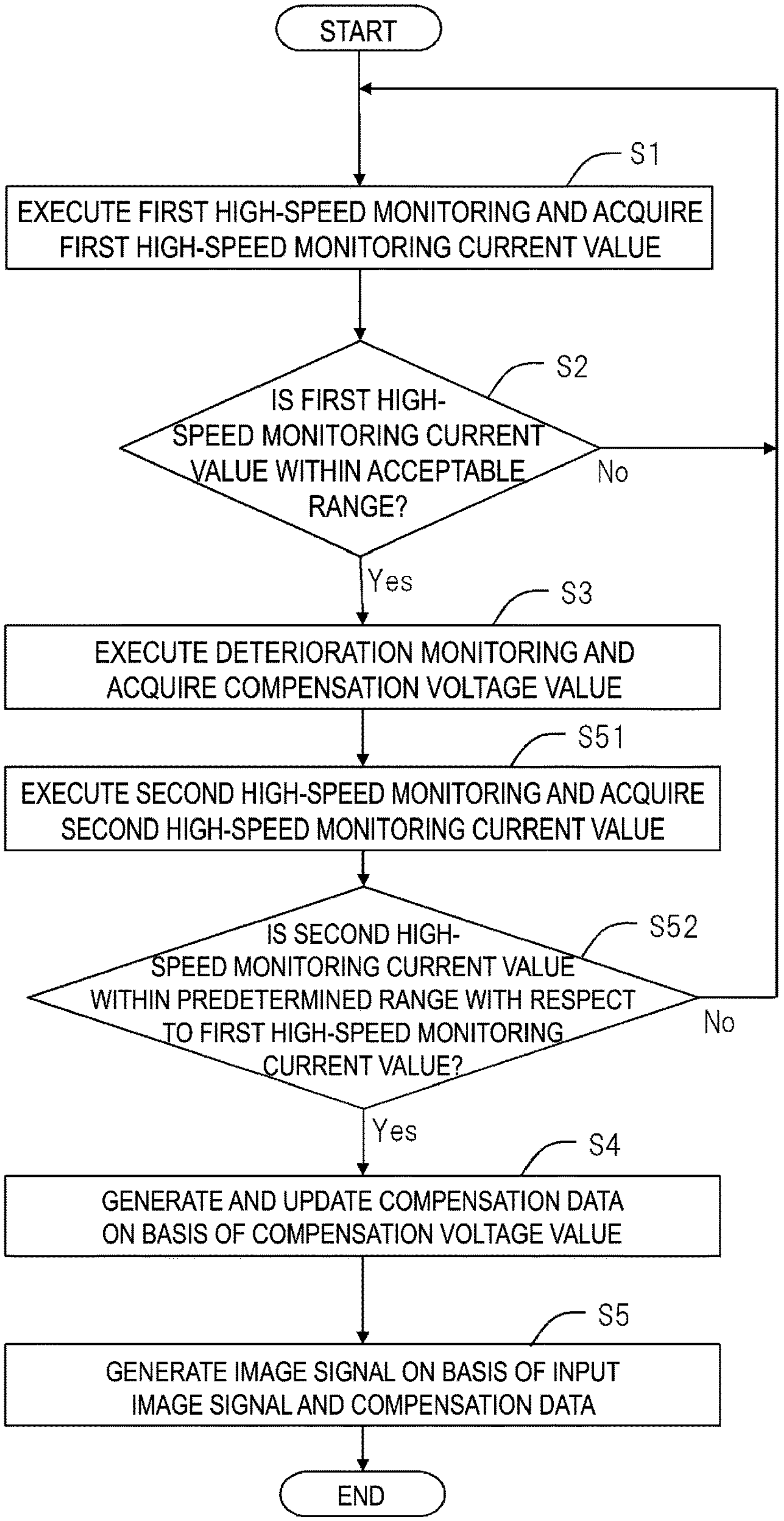
FIG. 13 is a diagram illustrating a schematic flow of the processing of the control unit according to the second modified example of the embodiment.

FIG. 13 is a diagram illustrating a schematic flow of the processing of the control unit 40 according to the second modified example of the embodiment. As illustrated in FIG. 13, when the control unit 40 executes the processing of step S1 described above using FIG. 8, first, the control unit 40 executes the first high-speed monitoring, which is the first in order high-speed monitoring, and acquires the first high-speed monitoring current value FMo1. Then, in step S2, when the comparison unit 42 references the reference data 52 stored in the storage unit 50 and determines that the first high-speed monitoring current value FMo1 is within the acceptable range (Yes in step S2), in step S3, the monitor control unit 43 having acquired the determination result executes the deterioration monitoring and acquires the compensation voltage value VC.

Next, in step S51, the monitor control unit 43 executes the processing for the second high-speed monitoring, which is the second in order high-speed monitoring, and acquiring the second high-speed monitoring current value FMo2. In other words, in step S51, the monitor control unit 43 executes the second high-speed monitoring to supply the predetermined voltage to each pixel circuit 20 via the source driver 30, and the control unit 40 acquires, via the source driver 30, the second high-speed monitoring current value FMo2, which is the output current value from the pixel circuits 20 supplied with the predetermined voltage.

Note that the specific content of the processing for executing the second high-speed monitoring and acquiring the second high-speed monitoring current value FMo2 in step S51 is similar to the processing for executing the first high-speed monitoring and acquiring the first high-speed monitoring current value FMo1 (the processing of step S1) described above using FIGS. 8 and 9.

Next, in step S52, the comparison unit 42 determines whether the second high-speed monitoring current value FMo2 is within a predetermined range with respect to the first high-speed monitoring current value FMo1. In step S52, in a case where the comparison unit 42 determines that the second high-speed monitoring current value FMo2 is not within the predetermined range with respect to the first high-speed monitoring current value FMo1 (No in step S52), it can be determined that the luminous efficiency of the group of pixels PX changed greatly during the execution of the deterioration monitoring. Thus, in step S3, the compensation voltage value VC acquired by the control unit 40 is not used, and the processing returns to step S1 again. In other words, the processing returns to step S1, and the control unit 40 executes the first high-speed monitoring, which is the first in order high-speed monitoring, and acquires the first high-speed monitoring current value FMo1 again.

Note that in step S52, in a case where the comparison unit 42 determines that the second high-speed monitoring current value FMo2 is not within the predetermined range with respect to the first high-speed monitoring current value FMo1 (No in step S52), the series of processing illustrated in FIG. 13 may be ended without returning to the processing of step S1. In addition, after the processing in the case of No in step S52 is repeated a predetermined number of times, the series of processing illustrated in FIG. 13 may be ended.

In step S52, in a case where the comparison unit 42 determines that the second high-speed monitoring current value FMo2 is within the predetermined range with respect to the first high-speed monitoring current value FMo1 (Yes in step S52), it can be determined that the luminous efficiency of the group of pixels PX has not changed greatly from before and after the execution of the deterioration monitoring. Thus, next, in step S4, the compensation data generation unit 44 generates the compensation data 51 on the basis of the compensation voltage value VC acquired by the monitor control unit 43 via the processing of step S3 and updates the compensation data 51 already stored in the storage unit 50 with the generated compensation data 51. Then, in step S5, the compensation unit 41 generates the image signal VDa on the basis of the input image signal VDb from the outside and the compensation data 51 stored in the storage unit 50.

In this manner, after executing the deterioration monitoring, the control unit 40 executes the second high-speed monitoring, which can be executed at a faster speed than the deterioration monitoring, to determine whether to generate the compensation data 51 and store the compensation data 51 in the storage unit 50 on the basis of the compensation voltage value (deterioration monitoring measurement value) VC obtained by executing the deterioration monitoring. Then, if the second high-speed monitoring current value (second high-speed monitoring measurement value) FMo2 obtained by the second high-speed monitoring is within the predetermined range with respect to the first high-speed monitoring current value (first high-speed monitoring measurement value) FMo1, the control unit 40 generates the new compensation data 51 on the basis of the compensation voltage value VC and updates the compensation data 51 stored in the storage unit 50 with the new compensation data 51.

Accordingly, it is possible to determine whether the luminous efficiency (for example, the current-voltage characteristics) of the group of pixels PX has unexpectedly changed greatly during the execution of the deterioration monitoring. Then, in a case where the luminous efficiency (for example, the current-voltage characteristics) of the group of pixels PX has not unexpectedly changed greatly during the execution of the deterioration monitoring, the compensation data 51 stored in the storage unit 50 is updated. In this manner, deterioration compensation for the group of pixels PX can be executed more accurately.

Note that in a case where Yes is determined in step S52 and the comparison unit 42 determines that the second high-speed monitoring current value FMo2 is within the predetermined range with respect to the first high-speed monitoring current value FMo1, the comparison unit 42 may further reference the reference data 52 stored in the storage unit 50 and determine that the second high-speed monitoring current value FMo2 is within the acceptable range, before the processing proceeds to step S4. Accordingly, deterioration compensation for the group of pixels PX can be executed more accurately.

Figure 14:
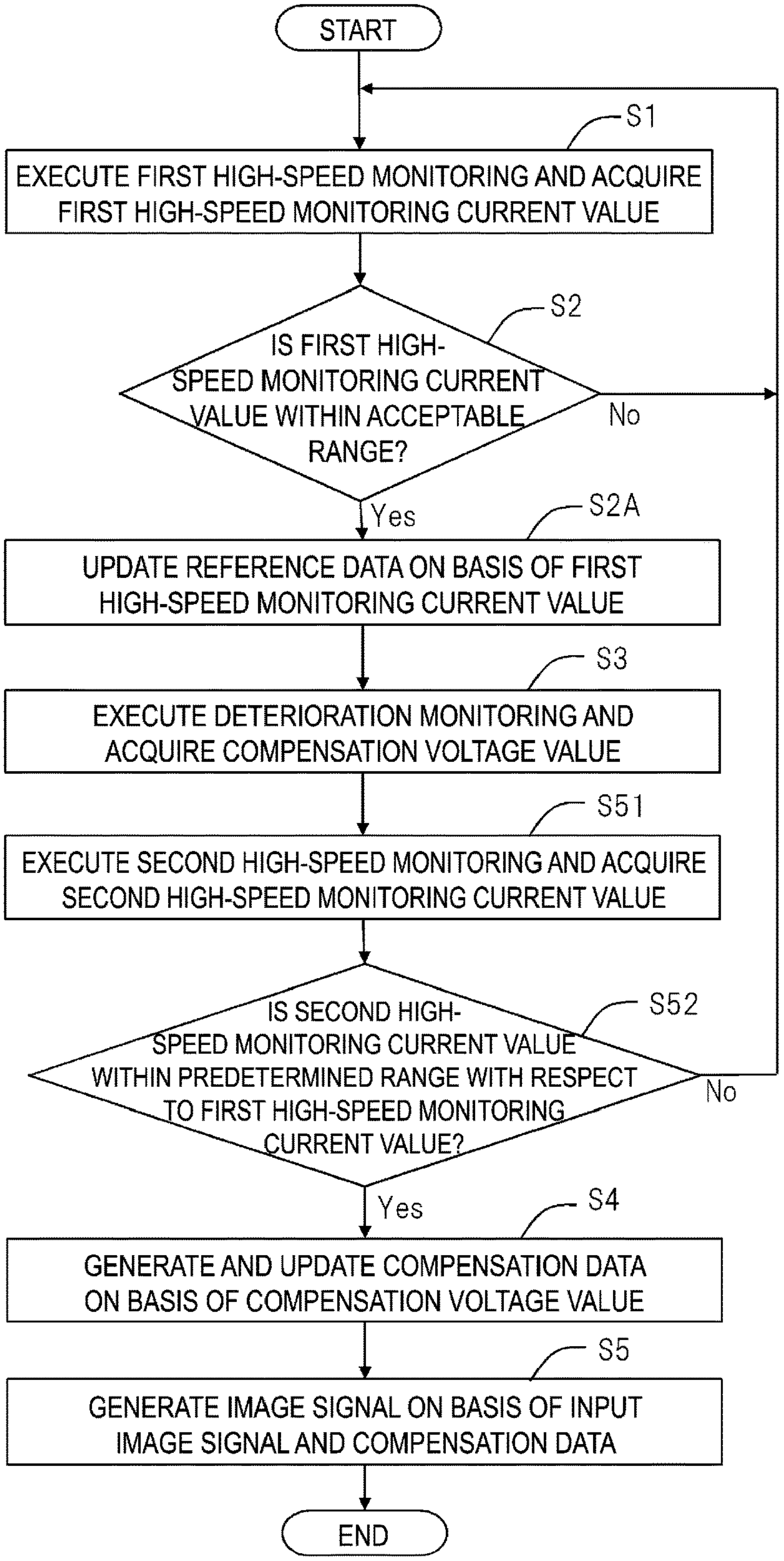
FIG. 14 is a diagram illustrating a schematic flow of the processing of the control unit according to a third modified example of the embodiment.

FIG. 14 is a diagram illustrating a schematic flow of the processing of the control unit 40 according to a third modified example of the embodiment. As illustrated in FIG. 14, the processing for updating the reference data 52 stored in the storage unit 50 on the basis of the processing of step S2A described above using FIG. 11, that is on the basis of the first high-speed monitoring current value FMo1 determined by the comparison unit 42 to be within the acceptable range in which the deterioration monitoring can be executed, may be added to the series of processing described above using FIG. 13.

Note that it is sufficient that the timing at which the processing of step S2A is executed is after the processing in the case of Yes in step S2 and is not limited to being before step S3. The processing of step S2A may be executed between steps S3 and S51, between steps S51 and S52, between step S52 in the case of Yes and step S4, between steps S4 and S5, or after step S5. Also, the processing of step S2A may be executed in parallel with the processing of each of steps S3, S51, S52, S4, and S5.

Figure 15:
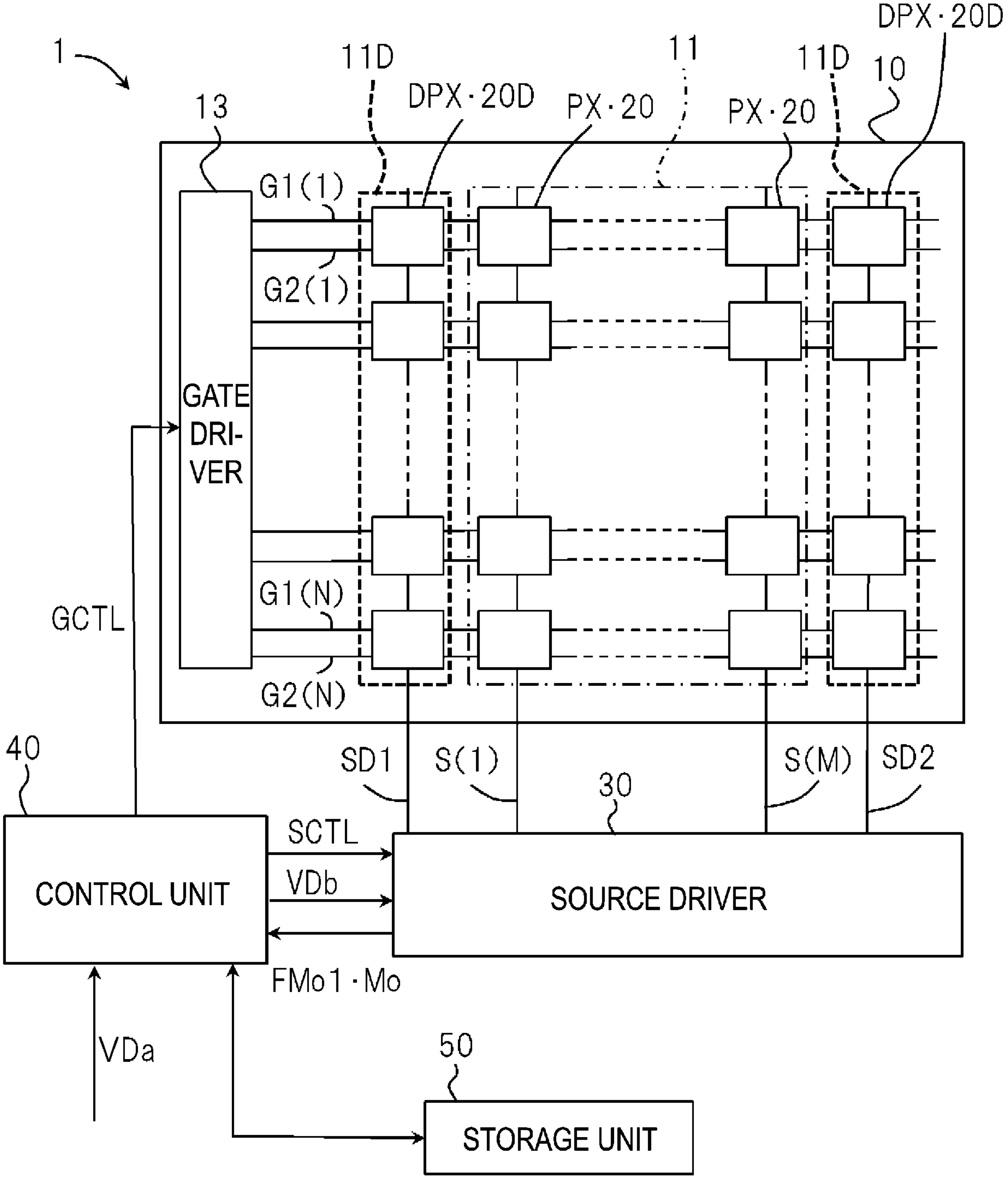
FIG. 15 is a diagram illustrating a schematic configuration of the display device according to a fourth modified example of the embodiment.

FIG. 15 is a diagram illustrating a schematic configuration of the display device 1 according to a fourth modified example of the embodiment. The display device 1 includes a group of dummy pixels DPX that do not contribute to image display and dummy data lines SD1 and SD2 each connected to the group of dummy pixels DPX. In the first high-speed monitoring, the monitor control unit 43 (see FIG. 2) may measure the current-voltage characteristics of the group of dummy pixels DPX instead of the group of pixels PX.

The dummy data lines SD1 and SD2 are provided on the outside of the data lines S(1) to S(M), sandwiching the data lines S(1) to S(M), and each include one end portion connected to the source driver 30. Each dummy pixel of the group of dummy pixels DPX is provided at a portion where the dummy data lines SD1 and SD2 intersect with the gate lines G1(1) to G1(N) and the monitor control lines G2(1) to G2(N).

For example, the dummy data line SD1 runs adjacent to the data line S(1) and intersects with the gate lines G1(1) to G1(N) and the monitor control lines G2(1) to G2(N) outside of the display region 11. A region in which the plurality of dummy pixels DPX are provided in a column aligned with the dummy data line SD1 and a region in which the plurality of dummy pixels DPX are provided in a column aligned with the dummy data line SD2 are each referred to as a dummy pixel region 11D.

Here, the group of pixels PX are pixels that contribute to image display as the light emitted during the normal display operation of the display device 1 reaches the viewer of the display device 1. On the other hand, the group of dummy pixels DPX are pixels that do not emit light and do not contribute to image display during the normal display operation of the display device 1. Each dummy pixel of the group of dummy pixels DPX includes a dummy pixel circuit 20D. The configuration of the dummy pixel circuit 20D is similar to the configuration of the pixel circuit 20 described above using FIG. 2.

Note that the group of dummy pixels DPX may be pixels that do not contribute to image display due to being provided invisibly to the viewer of the display device 1, such as being provided overlapping with a light blocking portion of the housing, for example.

FIG. 15 is a diagram illustrating an example in which the dummy pixel regions 11D are provided outside of the display region 11 on the left and the right, that is, extend adjacent to the data line S(1) and the data line S(M), but the positions of the dummy pixel regions 11D are not limited thereto. For example, the dummy pixel regions 11D may be provided outside of the display region 11 on the top and the bottom, that is, extend adjacent to the gate line G1(1) at the upper end and the monitor control line G2(N) at the lower end.

Any of the processing illustrated in FIGS. 8, 11, 13, and 14 may be used in the processing of the control unit 40 of the display device 1 according to the fourth modified example of the embodiment. However, in step S1, instead of acquiring the first high-speed monitoring current value FMo1 from each of the pixels of the group of pixels PX, the control unit 40 acquires the first high-speed monitoring current value FMo1 from each dummy pixel of the group of dummy pixels DPX. Also, in a case where the processing in FIG. 13 or FIG. 14 is used, in step S51, instead of acquiring the second high-speed monitoring current value FMo2 from each of the pixels of the group of pixels PX, the control unit 40 acquires the second high-speed monitoring current value FMo2 from each dummy pixel of the group of dummy pixels DPX.

In this manner, the control unit 40 may measure the current-voltage characteristics of the group of dummy pixels DPX in the first high-speed monitoring. Since the number of dummy pixels in the group of dummy pixels DPX is less than the number of pixels in the group of pixels PX, the first high-speed monitoring can be executed at a faster speed than in a case where the first high-speed monitoring is executed using the group of pixels PX. Accordingly, it is possible to more quickly determine whether the deterioration monitoring can be executed.

Since the number of dummy pixels in the group of dummy pixels DPX is less than the number of pixels in the group of pixels PX, the capacity of the reference data 52 for determining whether the first high-speed monitoring current value FMo1 obtained from the group of dummy pixels DPX is within the acceptable range is small, meaning the capacity inside the storage unit 50 required for storing the reference data 52 can be reduced.

In addition, the group of dummy pixels DPX are pixels that do not emit light during the normal display operation of the display device 1, and thus can be considered to be pixels with effectively no deterioration in luminous efficiency from the time of product shipment of the display device 1. Thus, when the first high-speed monitoring current value FMo1 is measured in the same temperature environment, the reference data 52 set at the time of product shipment of the display device 1 can be continually used. In other words, since it is possible to determine whether the first high-speed monitoring current value FMo1 is within the acceptable range without taking into account a decrease in the luminous efficiency of the group of dummy pixels DPX, whether the deterioration monitoring is in an executable state is easily determined.

Figure 16:
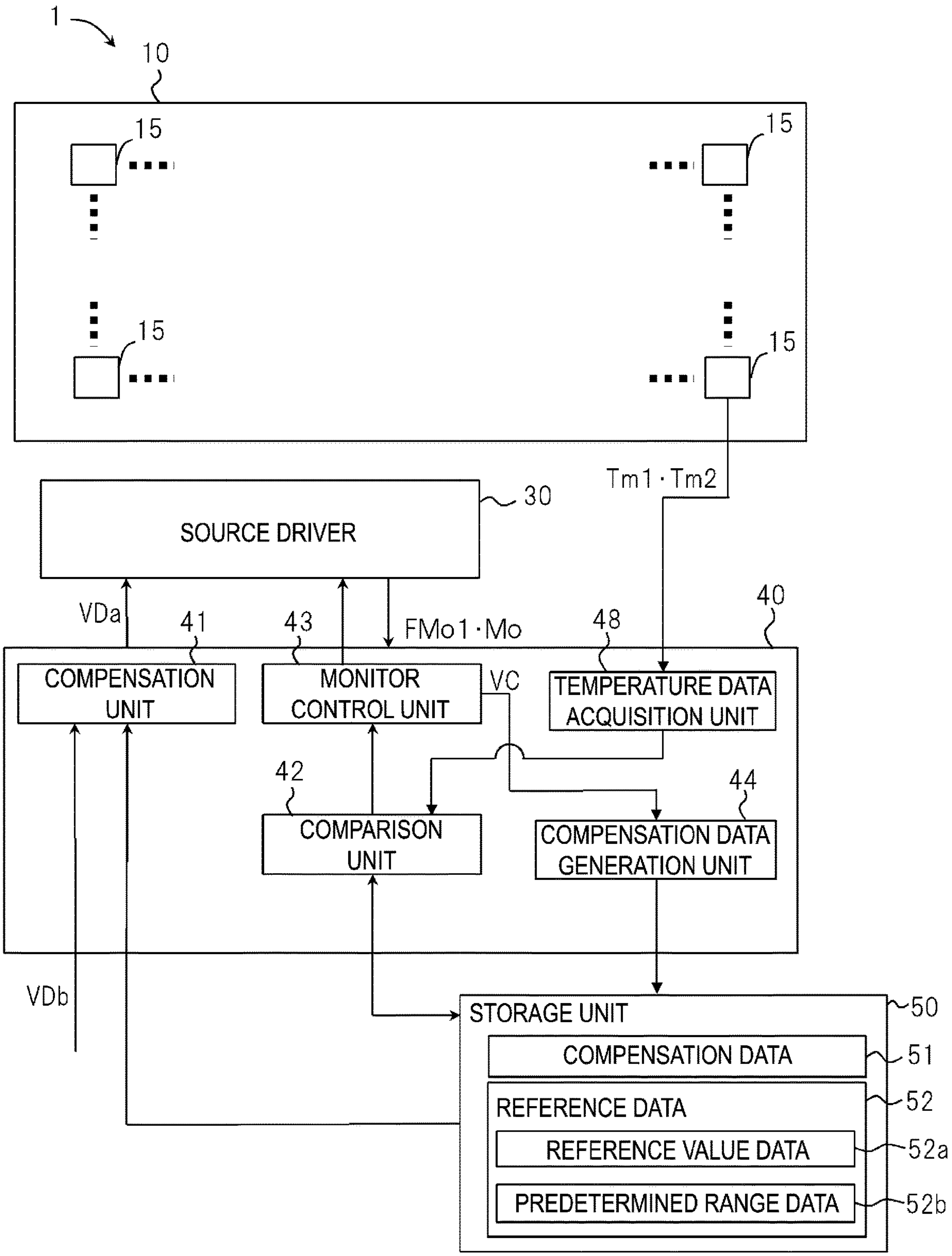
FIG. 16 is a diagram illustrating a schematic configuration of the display device according to a fifth modified example of the embodiment.

FIG. 16 is a diagram illustrating a schematic configuration of the display device 1 according to a fifth modified example of the embodiment. Since the current-voltage characteristics of the group of pixels PX also change depending on the temperature of the display panel 10, the control unit 40 may measure the temperature of the display panel 10 for the first high-speed monitoring instead of measuring the current-voltage characteristics of the group of pixels PX or the current-voltage characteristics of the group of dummy pixels DPX.

The display panel 10 according to the fifth modified example of the present embodiment may include one or more temperature sensors 15. In the example illustrated in FIG. 16, the group of temperature sensors 15 are provided in a matrix shape on the back surface (surface on the opposite side to the surface where the display region 11 is provided) of the display panel 10.

Also, the control unit 40 may include a temperature data acquisition unit 48. The temperature data acquisition unit 48 acquires the output from the group of temperature sensors 15 as a first temperature measurement value (first high-speed monitoring measurement value) Tm1 and a second temperature measurement value (second high-speed monitoring measurement value) Tm2. Note that in the fifth modified example of the present embodiment, of the reference data 52, the reference value indicated by the reference value data 52*a* and the predetermined range indicated by the predetermined range data 52*b* correspond to a value specifying the temperature (for example, the normal temperature in a stable environment) of the display panel 10 at which the deterioration monitoring can be allowed to be executed and the range thereof.

Figure 17:
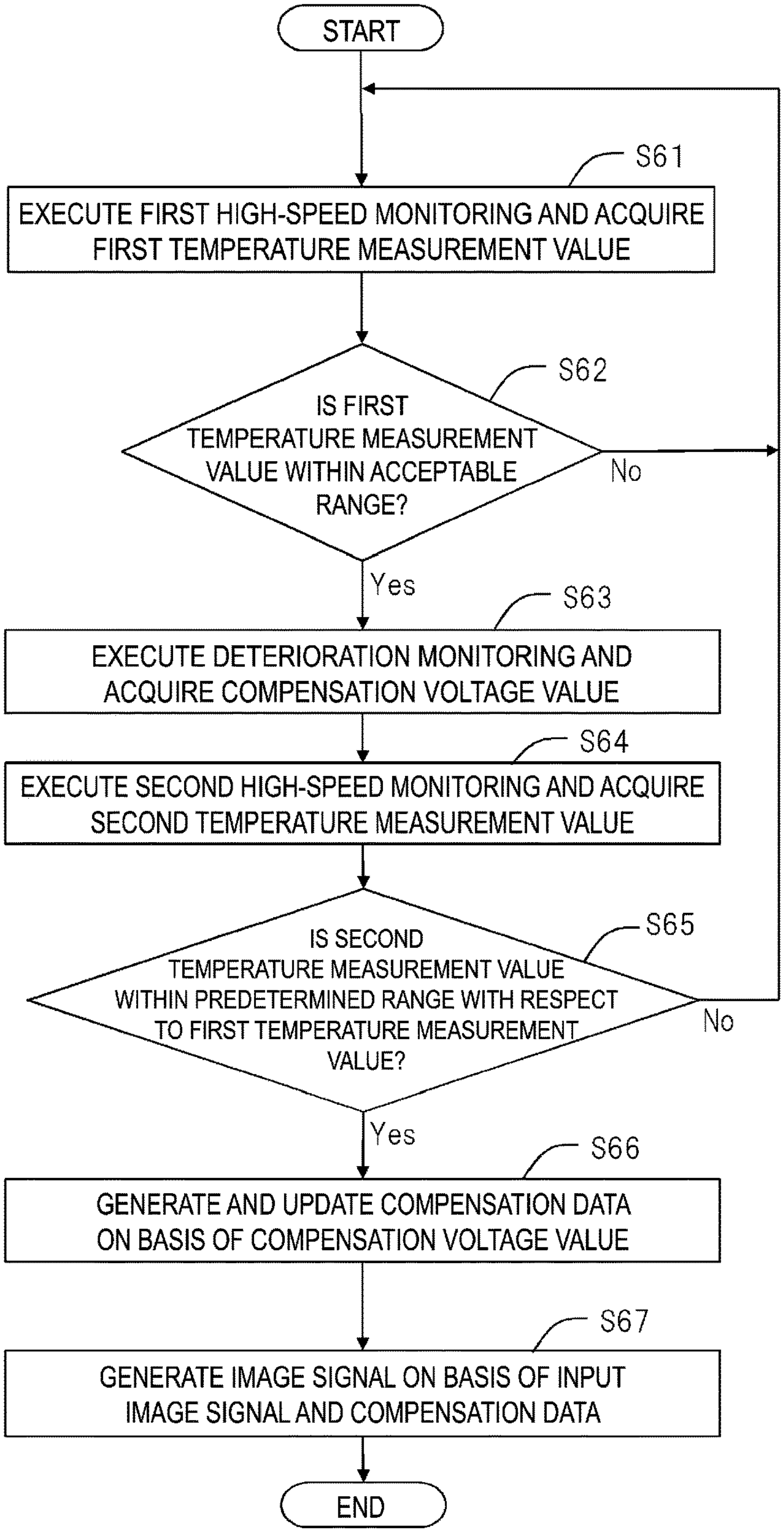
FIG. 17 is a diagram illustrating a schematic flow of the processing of the control unit according to the fifth modified example of the embodiment.

FIG. 17 is a diagram illustrating a schematic flow of the processing of the control unit 40 according to the fifth modified example of the embodiment. First, in step S61, the control unit 40 executes, as the first high-speed monitoring, the processing for acquiring the first temperature measurement value Tm1 from the group of temperature sensors 15. In other words, in step S61, when the monitor control unit 43 executes the first high-speed monitoring, the temperature data acquisition unit 48 acquires the output from the temperature sensors 15 as the first temperature measurement value Tm1 via measurement of the temperature of the display panel 10.

Next, in step S62, the comparison unit 42 references the reference data 52 stored in the storage unit 50 and determines whether the first temperature measurement value Tm1 acquired by the temperature data acquisition unit 48 is within the acceptable range in which the deterioration monitoring can be executed.

Then, in step S62, in a case where the comparison unit 42 determines that the first temperature measurement value Tm1 acquired from the temperature data acquisition unit 48 is not within the acceptable range in which the deterioration monitoring can be executed (No in step S62), the determination result is output to the monitor control unit 43. In a case where the determination result is acquired, the monitor control unit 43 can determine that the temperature of the display panel 10 has changed and the luminous efficiency of the group of pixels PX has temporarily changed greatly, that is, that the deterioration monitoring is not in an executable state, due to a change of the use environment of the display device 1 or the like, for example. Thus, the deterioration monitoring is not executed, and the processing returns to step S61 again. In other words, the processing returns to step S61, and the control unit 40 executes the first high-speed monitoring and acquires the first temperature measurement value Tm1.

Note that in step S62, in a case where the comparison unit 42 determines that the first temperature measurement value Tm1 is not within the acceptable range (No in step S62), the series of processing illustrated in FIG. 17 may be ended without returning to the processing of step S61. In addition, after the processing in the case of No in step S62 and the processing of step S61 is repeated a predetermined number of times, the series of processing illustrated in FIG. 17 may be ended.

Next, in step S62, in a case where the comparison unit 42 determines that the first temperature measurement value Tm1 is within the acceptable range (Yes in step S62), the determination result is output to the monitor control unit 43. In a case where the determination result is acquired, the monitor control unit 43 can determine that the temperature of the display panel 10 has not greatly changed, that is, that the change in the luminous efficiency of the group of pixels PX is within a range in which the deterioration monitoring can be executed. In other words, the monitor control unit 43 determines that the deterioration monitoring is in an executable state. Thus, next, in step S63, the control unit 40 executes the deterioration monitoring and acquires the compensation voltage value VC. Then, the monitor control unit 43 outputs information indicating the compensation voltage value VC to the compensation data generation unit 44. Note that the processing of step S63 is similar to the processing of step S3 described above using FIGS. 8, 11 to 14, and the like.

Next, in step S64, the monitor control unit 43 executes, as the second high-speed monitoring which is the second in order high-speed monitoring, the processing for acquiring the second temperature measurement value Tm2 from the group of temperature sensors 15. In other words, in step S64, when the monitor control unit 43 executes the second high-speed monitoring, the temperature data acquisition unit 48 acquires the output from the temperature sensors 15 as the second temperature measurement value Tm2 via measurement of the temperature of the display panel 10.

Note that the processing in step S64 for executing the second high-speed monitoring and acquiring the second temperature measurement value Tm2 is similar to the processing in step S61 for executing the first high-speed monitoring and acquiring the first temperature measurement value Tm1.

Next, in step S65, the comparison unit 42 determines whether the second temperature measurement value Tm2 is within a predetermined range with respect to the first temperature measurement value Tm1. In step S65, in a case where the comparison unit 42 determines that the second temperature measurement value Tm2 is not within the predetermined range with respect to the first temperature measurement value Tm1 (No in step S65), it can be determined that the temperature of the display panel 10 has changed greatly, that is, the luminous efficiency of the group of pixels PX has changed greatly, during the execution of the deterioration monitoring. Thus, in step S63, the compensation voltage value VC acquired by the control unit 40 is not used, and the processing returns to step S61 again. In other words, the processing returns to step S61, and the control unit 40 executes the first high-speed monitoring, which is the first in order high-speed monitoring, and acquires the first temperature measurement value Tm1.

Note that in step S65, in a case where the comparison unit 42 determines that the second temperature measurement value Tm2 is not within the predetermined range with respect to the first temperature measurement value Tm1 (No in step S65), the series of processing illustrated in FIG. 17 may be ended without returning to the processing of step S61. In addition, after the processing in the case of No in step S65 is repeated a predetermined number of times, the series of processing illustrated in FIG. 17 may be ended.

In step S65, in a case where the comparison unit 42 determines that the second temperature measurement value Tm2 is within the predetermined range with respect to the first temperature measurement value Tm1 (Yes in step S65), it can be determined that the temperature of the display panel 10 has not changed greatly, that is, that the luminous efficiency of the group of pixels PX has not changed greatly, from before and after the execution of the deterioration monitoring. Thus, next, in step S66, the compensation data generation unit 44 generates the compensation data 51 on the basis of the compensation voltage value VC acquired by the monitor control unit 43 via the processing of step S63 and updates the compensation data 51 already stored in the storage unit 50 with the generated compensation data 51.

Then, in step S67, the compensation unit 41 generates the image signal VDa on the basis of the input image signal VDb from the outside and the compensation data 51 stored in the storage unit 50.

Note that the processing of step S64 and the processing of step S65 for executing the second in order high-speed monitoring may be skipped.

In this manner, the display panel 10 may include the temperature sensor 15. Then, the temperature data acquisition unit 48 may acquire the output from the temperature sensor 15 as the first temperature measurement value (first high-speed monitoring measurement value) Tm1.

As described above, unlike the processing like the deterioration monitoring for supplying a voltage to the group of pixels PX a plurality of times, the first high-speed monitoring only acquires the output from the temperature sensor 15, and thus the processing can be faster than that of the deterioration monitoring. In other words, according to the display device 1, whether the deterioration monitoring for detecting a decrease in the luminous efficiency of the group of pixels PX is in an executable state can be determined at a fast speed. As a result, according to the display device 1, execution of deterioration monitoring for detecting a decrease in the luminous efficiency of a group of pixels can be suppressed when the luminous efficiency of a group of pixels is in a temporary state of change due to a change in temperature of the use environment of the display device or the like.

Also, after executing the deterioration monitoring, the control unit 40 executes the second high-speed monitoring, which can be executed at a faster speed than the deterioration monitoring, to determine whether to generate the compensation data 51 and store the compensation data 51 in the storage unit 50 on the basis of the compensation voltage value (deterioration monitoring measurement value) VC obtained by executing the deterioration monitoring. Then, if the second temperature measurement value (second high-speed monitoring measurement value) Tm2 obtained by the second high-speed monitoring is within the predetermined range with respect to the first temperature measurement value (first high-speed monitoring measurement value) Tm1, the control unit 40 generates the new compensation data 51 on the basis of the compensation voltage value VC and updates the compensation data 51 stored in the storage unit 50 with the new compensation data 51.

Accordingly, it is possible to determine whether the luminous efficiency (for example, the current-voltage characteristics) of the group of pixels PX has unexpectedly changed greatly during the execution of the deterioration monitoring due to a change in temperature of the display panel 10. Then, in a case where the luminous efficiency (for example, the current-voltage characteristics) of the group of pixels PX has not unexpectedly changed greatly during the execution of the deterioration monitoring, the compensation data 51 stored in the storage unit 50 is updated. In this manner, deterioration compensation for the group of pixels PX can be executed more accurately.

Note that the storage unit 50 is a computer-readable storage medium and may non-temporarily store a display program installed from a storage medium external to the display device 1 or a server capable of communicating with the display device 1. The display program causes the control unit 40 to function as the compensation unit 41, the comparison unit 42, the monitor control unit 43, the compensation data generation unit 44, and the temperature data acquisition unit 48. For example, the control unit 40 includes a computer as a hardware configuration. The computer may include a processor that causes the control unit 40 to function as the compensation unit 41, the comparison unit 42, the monitor control unit 43, the compensation data generation unit 44, and the temperature data acquisition unit 48 by executing the display program. The type of processor does not matter as long as it can realize functions by executing the display program. As the processor, it is possible to use various types of processors such as a central processing unit (CPU), a graphics processing unit (GPU), a digital signal processor (DSP), and an application specific integrated circuit (ASIC). The processor may include a peripheral circuit device in addition to CPU, GPU, DSP, or the like. The peripheral circuit device may be an integrated circuit (IC), or may include a resistor, a capacitor, and the like.

Note that the components described in the above-described embodiment and the modified examples may be appropriately combined in a range in which a contradiction does not arise.

The invention claimed is:

1. A display device comprising:

a display panel comprising a group of pixels;

a control circuitry configured to execute deterioration monitoring for detecting a decrease in a luminous efficiency of the group of pixels and first high-speed monitoring for determining whether to execute the deterioration monitoring, the first high-speed monitoring being executed at a faster speed than the deterioration monitoring; and a storage that stores reference data for specifying an acceptable range for executing the deterioration monitoring, wherein the reference data include reference value data indicating a predetermined reference value and predetermined range data indicating a first predetermined range, the control circuitry executes the deterioration monitoring in a case where a first high-speed monitoring measurement value obtained by the first high-speed monitoring is within the first predetermined range with respect to the reference value data, the storage further stores compensation data for compensating for the decrease in the luminous efficiency of the group of pixels, after executing the deterioration monitoring, the control circuitry further executes second high-speed monitoring for determining whether to generate the compensation data based on a deterioration monitoring measurement value obtained by executing the deterioration monitoring and stores the compensation data in the storage, the second high-speed monitoring being executed at a faster speed than the deterioration monitoring, and in a case where a second high-speed monitoring measurement value obtained by the second high-speed monitoring is within a second predetermined range with respect to the first high-speed monitoring measurement value, the control circuitry further generates new compensation data based on the deterioration monitoring measurement value and updates the compensation data stored in the storage with the new compensation data.

2. The display device according to claim 1, wherein in the first high-speed monitoring, the control circuitry acquires the first high-speed monitoring measurement value by measuring current-voltage characteristics of the group of pixels, and a number of times that current-voltage characteristics of each pixel of the group of pixels is measured in the deteriorating monitoring is more than a number of times that current-voltage characteristics of each pixel of the group of pixels is measured in the first high-speed monitoring.

3. The display device according to claim 1, further comprising:

a group of dummy pixels not contributing to image display, wherein in the first high-speed monitoring, the control circuitry acquires the first high-speed monitoring measurement value by measuring current-voltage characteristics of the group of dummy pixels.

4. The display device according to claim 1, wherein the display panel further comprises a temperature sensor, and the first high-speed monitoring measurement value is an output from the temperature sensor.

5. The display device according to claim 1, wherein the control circuitry further updates the reference data stored in the storage based on the first high-speed monitoring measurement value in a case where the first high-speed monitoring measurement value is within the acceptable range.

6. The display device according to claim 1, wherein the display panel is an organic electroluminescence (EL) display panel or a quantum dot light-emitting diode (QLED) display panel.

7. The display device according to claim 1, wherein at least one of the reference value data and the first predetermined range data is updated.

8. The display device according to claim 1, wherein at least one of the reference value data and the first predetermined range data is updated based on a first high-speed monitoring current value.

9. A display device comprising:

a display panel comprising a group of pixels;

a control circuitry configured to execute deterioration monitoring for detecting a decrease in a luminous efficiency of the group of pixels and first high-speed monitoring for determining whether to execute the deterioration monitoring, the first high-speed monitoring being executed at a faster speed than the deterioration monitoring; and a storage that stores reference data for specifying an acceptable range for executing the deterioration monitoring, wherein the control circuitry executes the deterioration monitoring in a case where a first high-speed monitoring measurement value obtained by the first high-speed monitoring is within the acceptable range, the storage further stores compensation data for compensating for the decrease in the luminous efficiency of the group of pixels, after executing the deterioration monitoring, the control circuitry further executes second high-speed monitoring for determining whether to generate the compensation data based on a deterioration monitoring measurement value obtained by executing the deterioration monitoring and stores the compensation data in the storage, the second high-speed monitoring being executed at a faster speed than the deterioration monitoring, and in a case where a second high-speed monitoring measurement value obtained by the second high-speed monitoring is within a predetermined range with respect to the first high-speed monitoring measurement value, the control circuitry further generates new compensation data based on the deterioration monitoring measurement value and updates the compensation data stored in the storage with the new compensation data.

* * * * *